(12) United States Patent
Hatch et al.

(10) Patent No.: US 12,285,704 B2
(45) Date of Patent: Apr. 29, 2025

(54) SULFONAMIDE BASED ANION EXCHANGE RESINS

(71) Applicants: Dionex Corporation, Sunnyvale, CA (US); Melvin Hatch, Sunnyvale, CA (US)

(72) Inventors: Melvin Hatch, Socorro, NM (US); Christopher A. Pohl, Union city, CA (US); Manikandan Jayaraman, San Jose, CA (US)

(73) Assignees: Dionex Corporation, Sunnyvale, CA (US); Melvin Hatch, Sunnyvale, CA (US)

( * ) Notice: Subject to any disclaimer, the term of this patent is extended or adjusted under 35 U.S.C. 154(b) by 980 days.

(21) Appl. No.: 17/354,058

(22) Filed: Jun. 22, 2021

(65) Prior Publication Data

US 2021/0308599 A1    Oct. 7, 2021

Related U.S. Application Data

(63) Continuation of application No. 15/800,781, filed on Nov. 1, 2017, now abandoned.

(51) Int. Cl.
*B01D 15/36* (2006.01)
*B01J 41/05* (2017.01)
(Continued)

(52) U.S. Cl.
CPC ......... *B01D 15/363* (2013.01); *B01D 15/361* (2013.01); *B01D 15/364* (2013.01);
(Continued)

(58) Field of Classification Search
None
See application file for complete search history.

(56) References Cited

U.S. PATENT DOCUMENTS

| 5,389,449 A | 2/1995 | Noubar et al. |
| 6,479,300 B1 | 11/2002 | Jiang et al. |

(Continued)

FOREIGN PATENT DOCUMENTS

| CN | 102883813 A | 1/2013 |
| CN | 103492077 A | 1/2014 |

(Continued)

OTHER PUBLICATIONS

Chinese Second Office Action dated Jan. 24, 2022 for Application No. 201811285091.2, 14 pages.

(Continued)

*Primary Examiner* — Kara M Peo
(74) *Attorney, Agent, or Firm* — Michael Best & Friedrich LLP

(57) ABSTRACT

An ion exchange resin for use as a stationary phase in an ion chromatography column. The ion exchange resin has a negatively charged substrate particle, a positively charged polymer layer bound to the negatively charged substrate particle, a linker, and an ion exchange group. The ion exchange group includes a sulfonamide group and an amine, in which the ion exchange group is coupled to the positively charged polymer layer via the linker. When the sulfonamide is in a neutral form, a positively charged amine group provides retention; while when the sulfonamide is in an anionic form, the sulfonamide anion becomes a counter ion to the positively charged amine group, forming a zwitterion that reduces retention at that site. Accordingly, the retention time is able to be controlled by adjusting the mobile phase pH.

12 Claims, 12 Drawing Sheets

(51) Int. Cl.
    *B01J 41/13*         (2017.01)
    *B01J 41/14*         (2006.01)
    *B01J 41/20*         (2006.01)

(52) U.S. Cl.
    CPC ............... *B01J 41/05* (2017.01); *B01J 41/13* (2017.01); *B01J 41/14* (2013.01); *B01J 41/20* (2013.01)

(56) References Cited

U.S. PATENT DOCUMENTS

| | | |
|---|---|---|
| 7,291,395 B2 | 11/2007 | Pohl et al. |
| 7,557,232 B2 | 7/2009 | Liu et al. |
| 9,034,447 B2 | 5/2015 | Pohl et al. |
| 9,283,494 B2 | 3/2016 | Pohl et al. |
| 9,340,562 B1 | 5/2016 | Liu et al. |
| 2005/0064192 A1 | 3/2005 | Jiang et al. |
| 2006/0180549 A1 | 8/2006 | Liu et al. |
| 2008/0293959 A1 | 11/2008 | Liu et al. |
| 2009/0078633 A1 | 3/2009 | Chen et al. |
| 2019/0126167 A1 | 5/2019 | Hatch et al. |

FOREIGN PATENT DOCUMENTS

| | | |
|---|---|---|
| CN | 104710639 A | 6/2015 |
| CN | 106256434 A | 12/2016 |
| CN | 107106931 A | 8/2017 |
| EP | 0166015 A1 | 1/1986 |
| EP | 1680432 B1 | 8/2014 |

OTHER PUBLICATIONS

Deruiter, Jack, Carboxylic Acid Structure and Chemistry: Part 2, Principles of Drug Action 1, Spring 2005, Carboxylic Acids Part 2, 10 pages.

Li, Yun et al. Dendrimer-Functionalized Mesoporous Silica as a Reversed-Phase / Anion-Exchange Mixed-Mode Sorbent for Solid Phase Extraction of Acid Drugs in Human Urine. Journal of Chromatography A, 1392 (2015)28-36. Year 2015, 3 pages.

The Advantages of Polymeric PLRP-S, Technical Overview, Agilent Technologies, 7 pages.

Quaternary Amine Definition. Schlumberger. 2 pages.

Chinese Office Action dated May 8, 2021 for Application No. 201811285091.2, 6 pages.

European Intent to Grant dated Dec. 9, 2020 for European Application No. 18202806.8, 6 pages.

European Office Action dated Mar. 7, 2019 for European Application No. 18202806.8, 9 pages.

European Supplemental Search Report dated Mar. 7, 2019 for European Application No. 18202806.8, 8 pages.

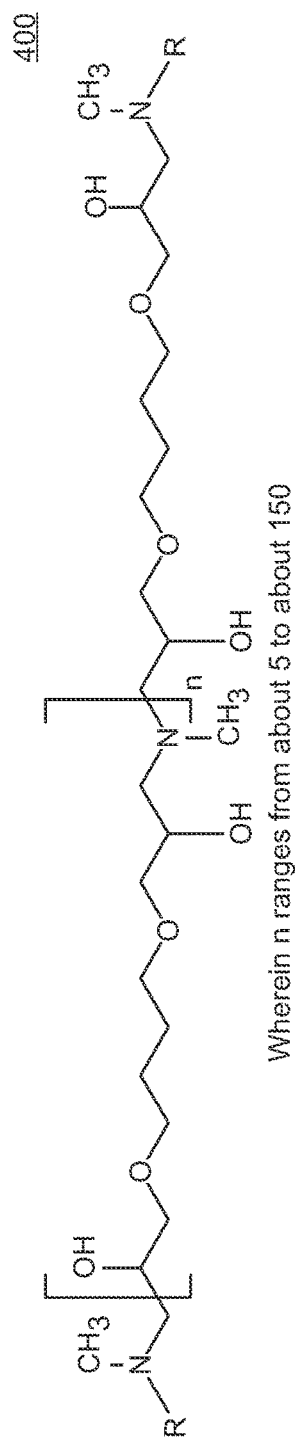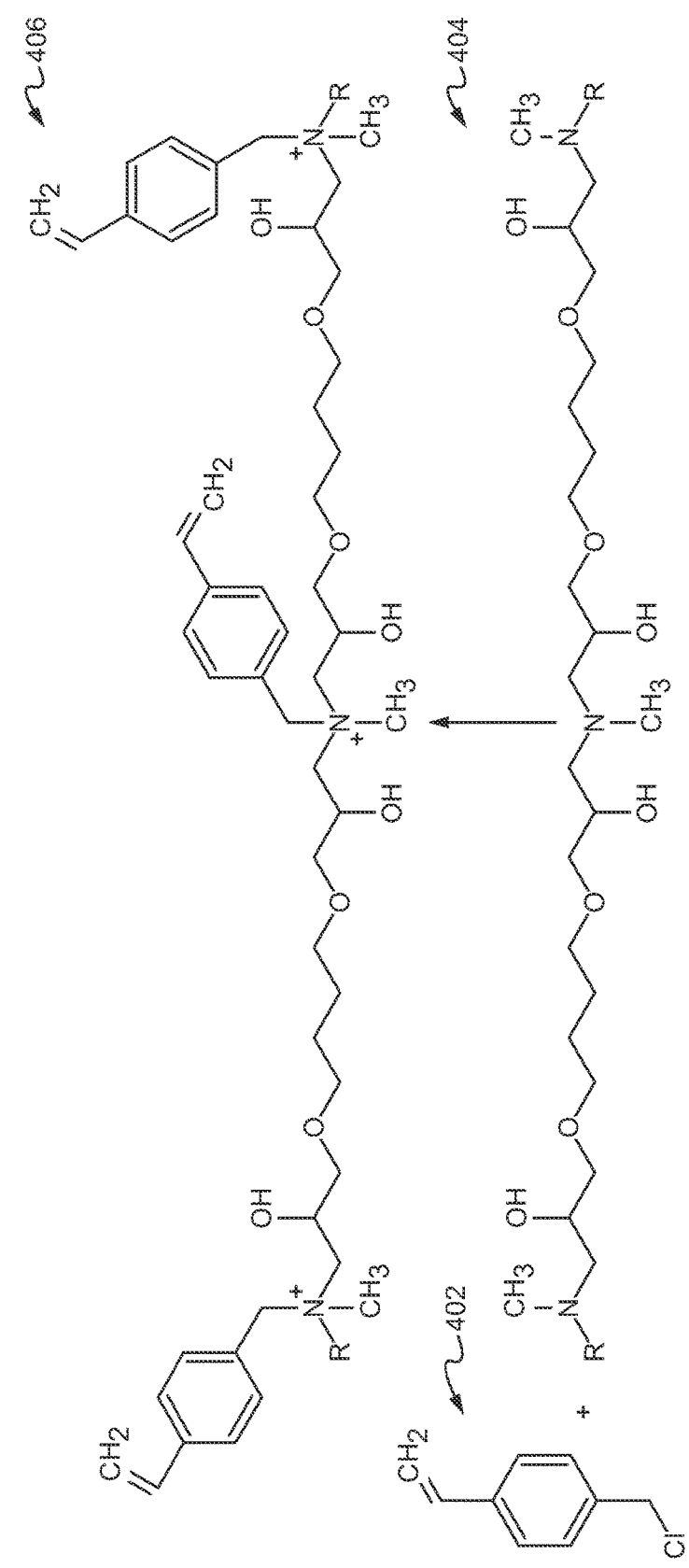
Fig. 4A
Fig. 4B

SULFONAMIDE BASED ANION EXCHANGE RESINS

CROSS-REFERENCE TO RELATED APPLICATIONS

This application is a continuation of U.S. patent application Ser. No. 15/800,781, filed on Nov. 1, 2017, now abandoned, which is incorporated by reference herein in its entirety.

FIELD OF THE INVENTION

This invention relates to the field of chromatographic sample separation that includes liquid chromatography and more particularly ion exchange chromatography. In particular, this invention relates to material and the synthesis of material for use as a stationary phase in chromatographic sample separation. The invention further relates to chromatographic columns containing the stationary phase and applications thereof.

BACKGROUND OF THE INVENTION

Hydroxide selectivity is a term that can be used to describe stationary phases for ion exchange chromatography that exhibit an unusually high affinity for the hydroxide anion. The earliest hydroxide selective phases were synthesized in the early 1950s, which can be referred to as type I anion exchange resins. Hydroxide selective phases may contain hydroxyl groups positioned near a quaternary amine ion exchange site of an anion exchange material. These hydroxyl groups can be weakly acidic when covalently bound to the resin such that they are sufficiently close to the anion exchange site. When the ion exchange site is in the hydroxide form, some of these hydroxyl groups can be converted into the anionic form, forming a zwitterion with the associated quaternary amine ion exchange site, negating the retention at that ion exchange site.

Generally, control of hydroxide selectivity is accomplished by changing the number of hydroxyl groups in the proximity of the quaternary amine ion exchange site. Hydroxyl groups in the beta position relative to the quaternary amine ion exchange site are more acidic than hydroxyl groups in the gamma or delta position relative to the quaternary ion exchange site so it is the beta hydroxyl groups that are predominantly responsible for hydroxide selectivity. The beta position indicates that there is a two-carbon spacer in between the hydroxyl group and the anion exchange group. Similarly, the gamma and delta positions respectively indicate that there is a three and four carbon spacer in between the hydroxyl group and the anion exchange group. The pKa of a beta hydroxyl group is believed to be about 13.9, which makes it about 100 times more acidic than a hydroxyl group not close to a quaternary amine group. As an example of a beta hydroxyl group with respect to a quaternary amine, it is worthwhile to note that choline has a hydroxyl group with a pKa of 13.9. For comparative purposes, ethanol, which does not have a proximate quaternary amine, has a hydroxyl group with a pKa of 15.9. The limitation of hydroxide selective phases, however, is that the pH must be very high in order to observe the effect of hydroxide selectivity. This renders such phases suitable for strong base hydroxide eluent systems, which can produce high pH (e.g., pH 11 to 13.5) in the stationary phase, but unsuitable for buffered carbonate/bicarbonate eluent systems which produce much lower stationary phase pH values. While hydroxide eluent systems in combination with a suppressor provide the advantages of relatively low background conductivity and compatibility with gradient elution chromatography, carbonate eluent systems are still widely used.

Modern ion chromatography phases may use a hyperbranched architecture, which can be hydroxide selective and are described in U.S. Pat. Nos. 7,291,395 and 9,283,494. A side effect of this hydroxide selectivity is an increase in the effective pH of the stationary phase when using carbonate-bicarbonate eluent systems. An undesirable consequence of this property is that phosphate, which can be partially trivalent and divalent for typical pH values used in testing, elutes at a time close to the elution time of the sulfate, which is relatively later than the monovalent ion in the chromatogram.

Phosphate is typically present in real drinking water samples as a minor component. Since carbonate eluent chromatography is invariably done under isocratic conditions and since peak height and sensitivity decreases with increasing retention under isocratic conditions, sensitivity for phosphate is compromised on such phases. Increasing the amount of bicarbonate (while keeping the carbonate concentration constant) to move the phosphate earlier in the chromatogram is one method to resolve the problem but increasing the amount of bicarbonate in the mobile phase has the side effect of increasing the background conductivity and the corresponding detection limit is degraded under these conditions. Applicant believes that there is a need for ion exchange resins that can separate divalent and trivalent ions with a carbonate based eluent under isocratic eluent conditions.

SUMMARY OF THE INVENTION

Functionalization of reactive monomers with an amino sulfonamide results in an ion exchange group with an acidic sulfonamide moiety adjacent to an ion exchange site. The term "adjacent" used herein throughout the present disclosure includes next to, nearby, or approximate, such as in the immediately next position or a position that is two or three atoms apart. Because sulfonamides have a pKa of approximately 9, this results in a buffered stationary phase when operating with carbonate eluent. When the sulfonamide is in a neutral form the adjacent quaternary side of the stationary phase provides retention: while when the sulfonamide is in an anionic form the sulfonamide anion becomes a counter ion to the quaternary ion exchange site, negating retention at that site. As a consequence, retention can be controlled by adjusting the mobile phase pH. In addition, this architecture results in a buffered system which minimizes the retention of trivalent species such as phosphate and arsenate which become divalent at elevated pH.

Under certain circumstances, samples containing analyte(s) of interest can have a relatively high ionic strength that interferes with a quantitative measurement of the analyte(s). Applicant believes that there is a need for anion exchange chromatographic resins that can quantitatively measure analyte concentrations, which is robust to changes in ionic strength by various anions, when using a carbonate-bicarbonate eluent system.

Under certain circumstances, a carbonate-bicarbonate eluent system can have a disturbance (peak or valley) caused by carbonate in the sample where such a disturbance can interfere with an analyte measurement. Applicant believes that there is a need for a carbonate-bicarbonate eluent system using anion exchange chromatographic resins that can adjust the retention time of the carbonate disturbance so that it does not interfere with an analyte peak of interest by varying the composition of the carbonate-bicarbonate eluent. Other features and advantages of the present invention will become apparent after reviewing the detailed description of the embodiments set forth below.

In an aspect, an ion exchange resin comprises a negatively charged substrate particle, a positively charged polymer layer bound to the negatively charged substrate particle, and an ion exchange group including a sulfonamide group and an amine, in which the ion exchange group is coupled to the positively charged polymer layer via the linker. The positively charged polymer layer includes a linker.

In some embodiments, the amine is selected from a group consisting of a secondary amine, a tertiary amine, a quaternary amine, and a combination thereof. In other embodiments, the ion exchange group includes a quaternary amine and the ion exchange group is configured to be zwitterionic when the sulfonamide is in a deprotonated stale. In some other embodiments, the negatively charged substrate particle is a polymeric particle and the ion exchange resin is configured to retain the ion exchange group when subjected to eluent having a pH ranging from 0 to 14, preferably 1 to 13, and more preferably 11 to 13. It should be noted that silica particle ion exchange resins are typically stable from pH 2 to 7. In some embodiments, the negatively charged substrate panicle comprises a sulfonated copolymer of an ethyl vinylbenzene and a divinylbenzene. In other embodiments, the negatively charged substrate particle comprises a super macroporous particle. In some other embodiments, the super macroporous particle has a diameter of 4-6 μm, a surface area of 20-30 $m^2/g$, pore sizes of 1000 Å-2000 Å, and a crosslinking mole ratio of 55% of the divinylbenzene a mole ratio of 45% of the ethylvinylbenzene. In some embodiments, the positively charged polymer layer comprises quaternary amines. In other embodiments, the positively charged polymer layer further comprises ether groups and hydroxyl groups. In some other embodiments, the positively charged polymer layer comprises a structure according to Formula (I):

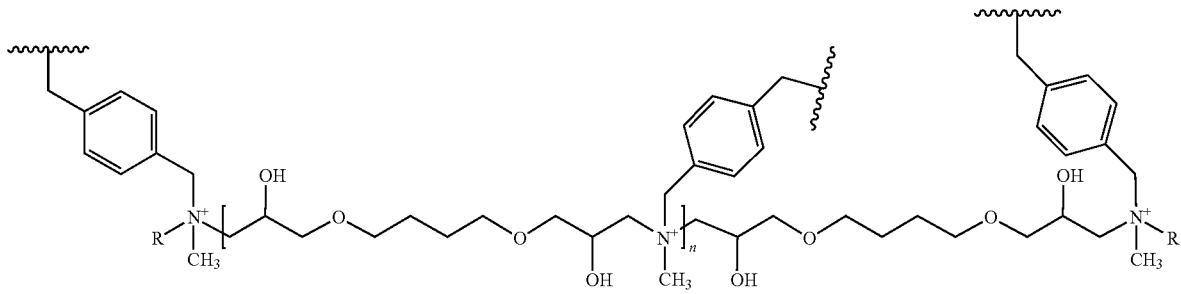

wherein n ranges from about 5 to about 150, and R is an alkyl group. In some embodiments, the positively charged polymer layer comprises a structure according to Formula (III):

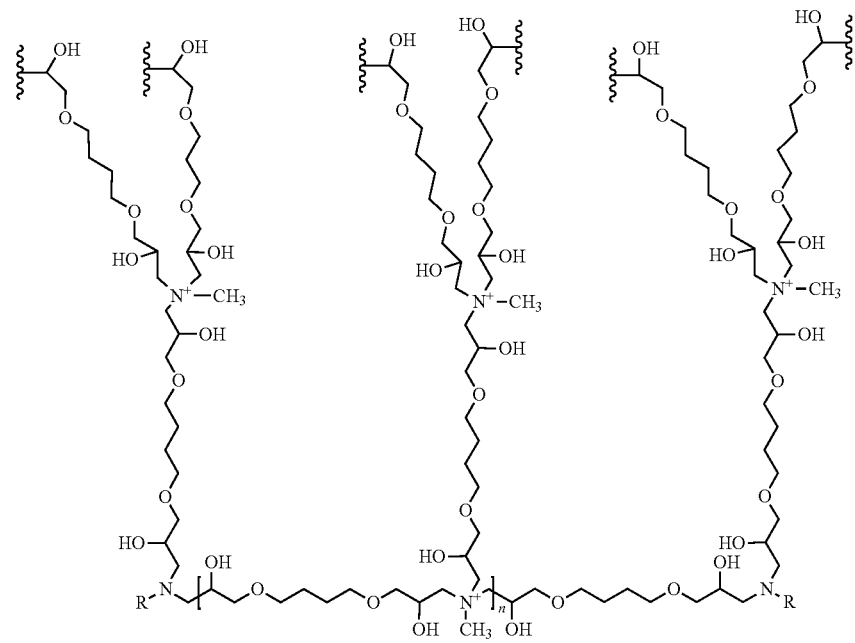

wherein n ranges from about 5 to about 150, and R is an alkyl group. In other embodiments, the linker includes an aromatic ring. In some other embodiments, the ion exchange group comprises a structure according to Formula (II):

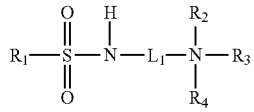

or a salt thereof, wherein $R_1$ is selected from unsubstituted alkyl, and substituted alkyl, $L_1$ is selected from substituted alkyl, unsubstituted alkyl, substituted aryl, and unsubstituted aryl, $R_2$ is selected front the group consisting of H, unsubstituted alkyl, substituted alkyl, a lone pair of electrons, and a support structure, in which the support structure includes the linker, the positively charged polymer layer, and the negatively charged substrate particle, $R_3$ is selected from the group consisting of H, unsubstituted alkyl, substituted alkyl, a lone pair of electrons, and the support structure, and $R_4$ is selected from the group consisting of H, unsubstituted alkyl, substituted alkyl, a lone pair of electrons, and the support structure, with the proviso that two or more of $R_2$, $R_3$, and $R_4$ cannot be lone pair electrons, and with the proviso that at least one of $R_2$, $R_3$, and $R_4$ comprises the support structure. In some other embodiments, $R_3$ and each include an unsubstituted alkyl containing two to three carbons and $R_3$ includes the support structure. In some other embodiments, the salt thereof comprises a quaternary amine and an anion, the anion selected from the group consisting of a hydroxide ion, a carbonate ion, a bicarbonate ion, and a combination thereof.

In another aspect, a method of using an ion exchange resin packed in a chromatography column comprises flowing an eluent through the chromatography column, in which the eluent comprises carbonate and bicarbonate, wherein the ion exchange resin containing a positively charged polymer layer coupled to the ion exchange resin, in which the positively charged polymer layer includes a linker and an ion exchange group including a sulfonamide group and a positively charged amine, in which the ion exchange group is coupled to the ion exchange resin via a linker, and separating a sample that includes a trivalent species. In some embodiments, the method further comprises adjusting a ratio of a carbonate concentration and a bicarbonate concentration so that a carbonate peak does not overlap with an analyte peak. In other embodiments, the method comprises adjusting a pH value of the eluent so that a first analyte peak does not overlap with a second analyte peak. In some other embodiments, the trivalent species includes phosphate or arsenate.

In another aspect, an ion exchange resin comprises a negatively charged substrate particle, a positively charged polymer layer bound to the negatively charged substrate particle, in which the positively charged polymer layer includes a linker, and a first ion exchange group including a first sulfonamide group and a first quaternary amine, in which the first ion exchange group is coupled to the positively charged polymer layer via the linker, and a second ion exchange group including a second sulfonamide group and a second quaternary amine, in which the second ion exchange group is coupled to the positively charged polymer layer via the linker, in which the first ion quaternary amine is different than the second quaternary amine.

In some embodiments, the first ion exchange group comprises N,N-dimethylaminopropyl methylsulfonamide and the second ion exchange group comprises N,N-diethylaminoethyl methylsulfonamide. In other embodiments, a ratio of the first ion exchange group to the second ion exchange group is 1:1.

BRIEF DESCRIPTION OF THE DRAWINGS

Embodiments will now be described by way of examples, with reference to the accompanying drawings which are meant to be exemplary and not limiting. For all figures mentioned herein, like numbered elements refer to like elements throughout.

FIG. 4A illustrates a structure of a base polymer layer in accordance with some embodiments.

FIG. 4B illustrates a process of grafting a linking agent of vinylbenzyl chloride to form the charged polymer layer in accordance with some embodiments.

DETAILED DESCRIPTION OF THE PREFERRED EMBODIMENT

Figure 1:
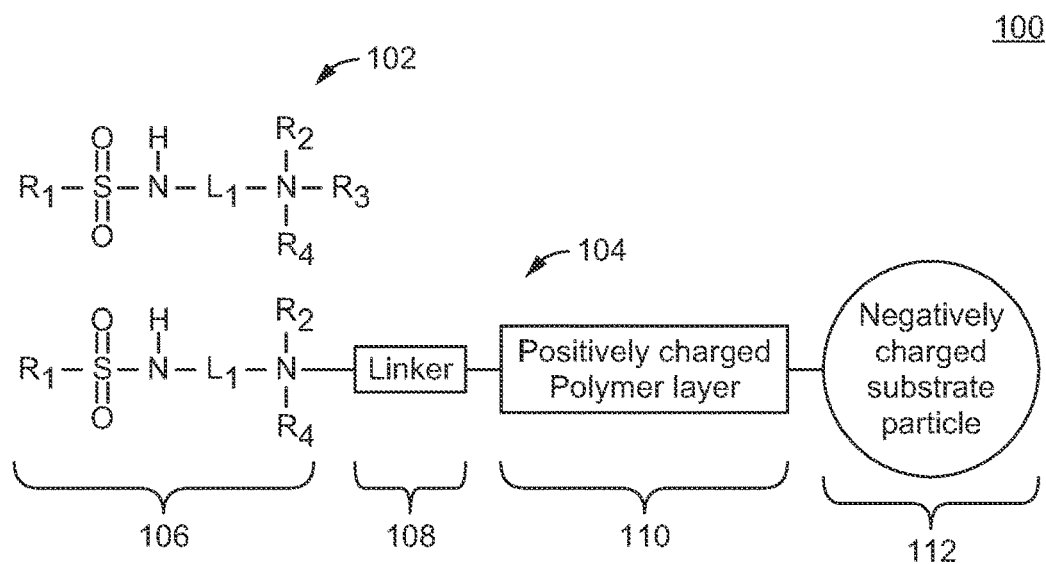
FIG. 1 illustrates schematic representations of a sulfonamide functional group on an ion exchange resin in accordance with some embodiments.

Reference is made in detail to the embodiments of the present invention, examples of which are illustrated in the accompanying drawings. While the invention is described in conjunction with the embodiments below, it is understood that they are not intended to limit the invention to these embodiments and examples. On the contrary, the invention is intended to cover alternatives, modifications and equivalents, which can be included within the spirit and scope of the invention as described herein. Furthermore, in the following detailed description of the present invention, numerous specific details are set forth in order to more fully illustrate the present invention. However, it is apparent to one of ordinary skill in the prior art having the benefit of this disclosure that the present invention can be practiced without these specific details. In other instances, well-known methods and procedures, components and processes have not been described in detail so as not to unnecessarily obscure aspects of the present invention. It is, of course, appreciated that in the development of any such actual implementation, numerous implementation-specific decisions must be made in order to achieve the developer's specific goals, such as compliance with application and business related constraints, and that these specific goals vary from one implementation to another and from one developer to another. Moreover, it is appreciated that such a development effort can be complex and time-consuming, but is nevertheless a routine undertaking of engineering for those of ordinary skill in the art having the benefit of this disclosure.

Definitions

Herein the term "zwitterionic" ligand refers to a molecule that contains both positive and negative charges and carries a zero or substantially zero net charge.

Herein the term "hydrocarbon" and the like (e.g., hydrocarbon moiety) includes alkyl and aryl groups as herein defined. Herein, the term hydrophobic moieties and the like (e.g., hydrophobic linkers) includes alkyl and aryl groups as herein defined.

Herein the term "linker" includes any chemical structures, functional groups, and moiety that is able to connect at least two chemical moieties. The connection is able to be formed by any type of chemical reaction, such as polymerization. The linker may be any hydrophobic chain of chemical structure. In some embodiments, the linkers and L1 (FIG. 1) are independently hydrophobic moieties selected from substituted or unsubstituted alkyl and substituted or unsubstituted aryl. Herein the term "moiety" includes any selected portion of a chemical structure.

Herein the term "alkyl," by itself or as part of another substituent, means, unless otherwise stated, a straight or branched chain, or cyclic hydrocarbon radical, or combination thereof, which is able to be fully saturated, mono- or polyunsaturated and is able it) include di- and multivalent radicals, having the number of carbon atoms designated (e.g., $C_1$-$C_{10}$ means one to ten carbons). Examples of saturated hydrocarbon radicals include, but are not limited to, groups such as methyl, ethyl, n-propyl (e.g., —$CH_2$—$CH_2$—$CH_3$, —$CH_2$—$CH_2$—$CH_2$), isopropyl, n-butyl, t-butyl, isobutyl, sec-butyl, cyclohexyl, (cyclohexyl)methyl, cyclopropylmethyl, homologs and isomers of, for example, n-pentyl, n-hexyl, n-heptyl, n-octyl, and the like. An unsaturated alkyl group is one having one or more double bonds or triple bonds. Examples of unsaturated alkyl groups include, but are not limited to, vinyl, 2-propenyl, crotyl, 2-isopentenyl, 2-(butadienyl), 2,4-pentadienyl, 3-(1,4-pentadienyl), ethynyl, 1- and 3-propynyl, 3-butynyl, and the higher homologs and isomers. The term "alkyl," unless otherwise noted, is also meant to include those derivatives of alkyl defined in more detail below, such as "heteroalkyl." Alkyl groups that are limited to hydrocarbon groups are termed "homoalkyl." The term "alkyl" is also able to mean "alkylene" or "alkyldiyl" as well as alkylidene in those cases where the alkyl group is a divalent radical.

Typical alkyl groups include, but are not limited to: methyl; ethyls such as ethanyl, ethenyl, ethynyl: propyls such as propan-1-yl, propan-2-yl, cyclopropan-1-yl, prop-1-en-1-yl, prop-1-en-2-yl, prop-2-en-1-yl (allyl), cyclopropan-1-en-1-yl: cycloprop-2-en-1-yl, prop-1-yn-1-yl, prop-2-yn-1-yl, etc.; butyls such as butan-1-yl, butan-2-yl, 2-methylpropan-1-yl, 2-methyl-propan-2-yl, cyclobutan-1-yl, but-1-en-1-yl, but-1-en-2-yl, 2-methyl-prop-1-en-1-yl, but-2-en-1-yl, but-2-en-2-yl, buta-1,3-dien-1-yl, buta-1,3-dien-2-yl, cyclobut-1-en-1-yl, cyclobut-1-en-3-yl, cyelobuta-1,3-dien-1-yl, but-1-yn-1-yl, but-1-yn-3-yl, but-3-yn-1-yl, etc.; and the like.

Herein the terms "halo" or "halogen," by themselves or as part of another substituent, mean, unless otherwise stated, a fluorine, chlorine, bromine, or iodine atom. Additionally, terms such as "haloalkyl," are meant to include monohaloalkyl and polyhaloalkyl. For example, the term "halo($C_1$-$C_4$)alkyl" is meant to include, but not be limited to, trifluoromethyl, 2,2,2-trifluoroethyl, 4-chlorobutyl, 3-bromopropyl, and the like.

Herein the term "aryl" means, unless otherwise stated, a polyunsaturated, aromatic, substituent that is able to be a single ring or multiple rings (preferably from 1 to 3 rings), which are fused together or linked covalently. The term "heteroaryl" refers to aryl groups (or rings) that contain from one to four heteroatoms selected from N, O, S, Si and B, wherein the nitrogen and sulfur atoms are optionally oxidized, and the nitrogen atom(s) are optionally quaternized. A heteroaryl group is able to be attached to the remainder of the molecule through a heteroatom. Non-limiting examples of aryl and heteroaryl groups include phenyl, 1-naphthyl, 2-naphthyl, 4-biphenyl, 1-pyrrolyl, 2-pyrrolyl, 3-pyrrolyl, 3-pyrazolyl, 2-imidazolyl, 4-imidazolyl, pyrazinyl, 2-oxazolyl, 4-oxazolyl, 2-phenyl-4-oxazolyl, 5-oxazolyl, 3-isoxazolyl, 4-isoxazolyl, 5-isoxazolyl, 2-thiazolyl, 4-thiuzolyl, 5-thiazolyl, 2-furyl, 3-furyl, 2-thienyl, 3-thienyl, 2-pyridyl, 3-pyridyl, 4-pyridyl, 2-pyrimidyl, 4-pyrimidyl, 5-benzothiazolyl, purinyl, 2-benzimidazolyl, 5-indolyl, 1-isoquinolyl, 5-isoquinolyl, 2-quinoxalinyl, 5-quinoxalinyl, 3-quinolyl, and 6-quinolyl. Substituents for each of the above noted aryl and heteroaryl ring systems are selected from the group of acceptable substituents described below.

For brevity, herein the term "aryl" when used in combination with other terms (e.g., aryloxy, arylthioxy, arylalkyl) includes both aryl and heteroaryl rings as defined above. Thus, the term "arylalkyl" is meant to include those radicals in which an aryl group is attached to an alkyl group (e.g., benzyl, phenethyl, pyridylmethyl and the like) including those alkyl groups in which a carbon atom (e.g., a methylene group) has been replaced by, for example, an oxygen atom (e.g., phenoxymethyl, 2-pyridyloxymethyl, 3-(1-napthoxy) propyl, and the like).

Each of the above terms (e.g., "alkyl," "heteroalkyl," "aryl" and "heteroaryl") are meant to include both substituted and unsubstituted forms of the indicated radical. Preferred substituents for each type of radical are provided below.

Substituents for the alkyl and heteroalkyl radicals (including those groups often referred to as alkylene, alkenyl, heteroalkylene, heteroalkenyl, alkynyl, cycloalkyl, heterocycloalkyl, cycloalkenyl, and heterocycloalkenyl) are genetically referred to as "alkyl group substituents," and they are able to be one or more of a variety of groups selected from, but not limited to: substituted or unsubstituted aryl, substituted or unsubstituted heteroaryl, substituted or unsubstituted heterocycloalkyl, —OR', =O, =NR', =N—OR', —NN'R", —SR', -halogen, —SiR'R"R"', —OC(O)R', —C(O)R', —CO$_2$R', —CONR'R", —OC(O)NR'R", —NR"C(O)R', —NR'—C(O)N R"R"', —NR"C(O)$_2$R', —NR—C(NR'R"R"')=NR" ", —NR—C(NR'R")=NR"', —S(O)R', —S(O)$_2$R', —OS(O)$_2$R', —S(O)$_2$NR'R", —NRSO$_2$R', —CN and —NO$_2$ in a number ranging from zero to (2m'+1), where m' is the total number of carbon atoms in such radical. R', R", R"' and R" " each preferably independently refer to hydrogen, substituted or unsubstituted heteroalkyl, substituted or unsubstituted aryl, e.g., aryl substituted with 1-3 halogens, substituted or unsubstituted alkyl, alkoxy or thioalkoxy groups, or arylalkyl groups. When a compound described herein includes more than one R group, for example, each of the R groups is independently selected as are each R', R", R"' and R" " groups when more than one of these groups is present. When R' and R" are attached to the same nitrogen atom, they are able to be combined with the nitrogen atom to form a 5-, 6-, or 7-membered ring. For example, —NR'R" is meant to include, but not be limited to, 1-pyrrolidinyl and 4-morpholinyl. From the above discussion of substituents, one skilled in the art will understand that the term "alkyl" is meant to include groups including carbon atoms bound to groups other than hydrogen groups, such as haloalkyl (e.g., —CF$_3$ and —CH$_2$CF$_3$) and acyl (e.g., —C(O)CH$_3$, —C(O) CF$_3$, —C(O)CH$_2$OCH$_3$, and the like).

Similar to the substituents described for the alkyl radical, substituents for the aryl and heteroaryl groups are genetically referred to as "aryl group substituents." The substituents are selected from, for example: substituted or unsubstituted alkyl, substituted or unsubstituted aryl, substituted or unsubstituted heteroaryl, substituted or unsubstituted heterocycloalkyl, —OR', =O, =NR', =N—OR', —NR'R", —SR', -halogen, —SiR'R"R"', —OC(O)R', —C(O)R', —CO$_2$R', —CONR'R", —OC(O)NR'R", —NR"C(O)R', —NR'—C(O)NR"R"', —NR"C(O)$_2$R', —NR—C(NR'R"R"')=NR" ", —NR—C(NR'R")=NR"', —S(O)R', —S(O)$_2$R', —S(O)$_2$NR'R", —NRSO$_2$R', —CN and —NO$_2$, —R', —N$_3$, —CH(Ph)$_2$, fluoro(C$_1$-C$_4$)alkoxy, and fluoro (C$_1$-C$_4$)alkyl, in a number ranging from zero to the total number of open valences on the aromatic ring system; and where R', R", R and R" " are preferably independently selected from hydrogen, substituted or unsubstituted alkyl, substituted or unsubstituted heteroalkyl, substituted or unsubstituted aryl and substituted or unsubstituted heteroaryl. When a compound described herein includes more than one R group, for example, each of the R groups is independently selected as are each R', R", R"' and R" " groups when more than one of these groups is present.

A squiggle line can be used for illustrative purposes and indicates a bond to an immediately adjacent moiety such as, for example, an anion exchange group that includes a sulfonamide group.

The ion exchange group that is configured to form a zwitterionic group attached to the surface, e.g., fixed in close proximity to the surface, of a substrate which thereby imparts unique phase selectivity towards small ions compared to standard mono-selective ion-exchange materials. The zwitterionic groups, which include sulfonamides and positively charged amines, are attached at the outer surface and/or within the volume of the stationary phase, e.g., on the surface within the pores of a porous substrate.

The ion exchange group that is configured to form a zwitterionic group is able to be grafted onto a polymer (e.g., positive charged or neutral) using one or more unsaturated bonds via one or more polymerization reactions. Any other processes and methods that are able to immobilize the ion exchange groups that are configured to form zwitterionic groups as part of the stationary phase are within the scope of the present disclosure.

A solution to the problem of preparing a suitable stationary phase for trivalent analytes or partially trivalent analytes (e.g., phosphate and arsenate) includes the use of an amino sulfonamide reagent. The sulfonamide moiety in the reagent is weakly acidic with a pKa of approximately 9 to 10. The amine functional group in the reagent is capable of reacting with a linking compound (e.g., vinylbenzyl chloride and glycidyl methacrylate) that are typically used to produce anion exchange sites in anion exchange materials. Functionalization of reactive monomers with a tertiary amino sulfonamide may result in a quaternary ion exchange site with an acidic sulfonamide moiety adjacent to the quaternary ion exchange site. Because sulfonamides have a pKa of approximately 9 to 10, this results in a buffered stationary phase when operating with carbonate eluent.

When the sulfonamide is in a neutral form and the amine group has a positive charge, the charged amine group of the stationary phase provides anion retention: while when the sulfonamide is in an anionic form, the sulfonamide anion becomes a counter ion to the positively charged ion exchange site, negating retention of anions at that site. As a result, anion retention can be controlled by adjusting the mobile phase pH.

In addition, this architecture results in a buffered system which reduces the retention of trivalent species such as phosphate and arsenate which can become partially or fully trivalent at elevated pH. Materials using the combination of sulfonamide and anion exchange sites have been produced using a pre-functionalized sulfonamide-quaternary anion exchange monomer via graft polymerization and by hyperbranched condensation polymerization. Materials have also been prepared by functionalizing latex particles prepared from reactive monomers with the tertiary amino sulfonamide reagent. Materials produced using both synthesis methods exhibit significantly reduced retention time of phosphate relative to sulfate anions that are both commonly of interest in the analytical chemistry of drinking water.

Another advantage of this ion exchange site is the relatively early elution of carbonate in the chromatogram. Carbonate in a sample containing an analyte is generally "invisible" when using carbonate eluents but small baseline disturbances are often observed with samples that are at extremes with regard to pH or ionic strength. By using a buffered stationary phase, this carbonate disturbance can be moved earlier in the chromatogram where it is easier to position the carbonate baseline disturbance a suitable distance away from other common anions.

Thus, a buffered stationary phase is disclosed in accordance with some embodiments that allows for reduced retention of partially trivalent species such as phosphate and arsenate when using carbonate eluent.

FIG. 1 illustrates a process of making ion exchange sites, that can form zwitterionic state, of an ion exchange resin in accordance with some embodiments.

In an aspect, the ion exchange resin has a negatively charged substrate particle, a positively charged polymer layer bound to the negatively charged substrate particle, a linker, and an ion exchange functional group. In some embodiments, the ion exchange group includes a sulfonamide group and an amine that is either secondary, tertiary, or quaternary. In some embodiments, the ion exchange group is linked/coupled to the positively charged polymer layer via the linker.

Chemical structure 102 shows an exemplary structure of the ion exchange functional groups in accordance with some embodiments. In some embodiments, the $R_1$ is selected from a group consisting of methyl, ethyl, propyl, butyl, pentyl, hexyl, and heptyl. Preferably, $R_1$, may be an unsubstituted alkyl ranging from $C_1$ to $C_3$. A person of ordinary skill in the art appreciates that any other alkyl groups are within the scope of the present invention. $L_1$ is selected front a group consisting of substituted or unsubstituted alkyl and substituted or unsubstituted aryl. Preferably, $L_1$, may be an unsubstituted alkyl ranging from $C_2$ to $C_3$. $R_2$, $R_3$, and $R_4$ are selected from a group consisting of unsubstituted alkyl (e.g., $C_1$ to $C_3$) and a lone pair of electrons. In some embodiments, at least one of the $R_2$, $R_3$, and $R_4$ includes the linker. In addition, at least one of the $R_2$, $R_3$, and $R_4$ includes the linker, the positively charged polymer, and the negatively charged substrate particle. $R_2$, $R_3$, and $R_4$ are selected such that two or more of $R_2$, $R_3$, and $R_4$ cannot be a lone pair of electrons. Preferably, when two of $R_2$, $R_3$, and $R_4$ are unsubstituted alkyls, the unsubstituted alkyls range from $C_2$ to $C_3$ and one of $R_2$, $R_3$, and $R_4$ includes a support structure. The support structure can include the linker, the positively charged polymer, and the negatively charged substrate particle. When each of $L_1$, $R_2$, $R_3$, and $R_4$ have an alkyl portion attached to the nitrogen group, chemical structure 102 includes a quaternary amine in a salt form. Examples of quaternary amine salt counterions may include hydroxide, carbonate, bicarbonate, or a combination thereof, where carbonate is a preferred embodiment.

The chemical structure 104 shows an exemplary structure of the chemical structure 102 when $R_3$ of the ion exchange moiety 106 is directly connected to or coupled with a linker 108. The linker 108 is directly connected to and/or coupled with a positively charged polymer layer 110. The positively charged polymer layer 110 is directly connected to or coupled with the negatively charged substrate particle 112.

In some embodiments, the ion exchange moiety 106 is directed connected to a substrate (e.g., the negatively charged substrate particle 112 and any other substrates via covalent bonds, ionic bonds, or hydrogen bonds). Any other variations of the connectivity of the ion exchange moiety 106 are within the scope of the present disclosure.

Figure 2A:
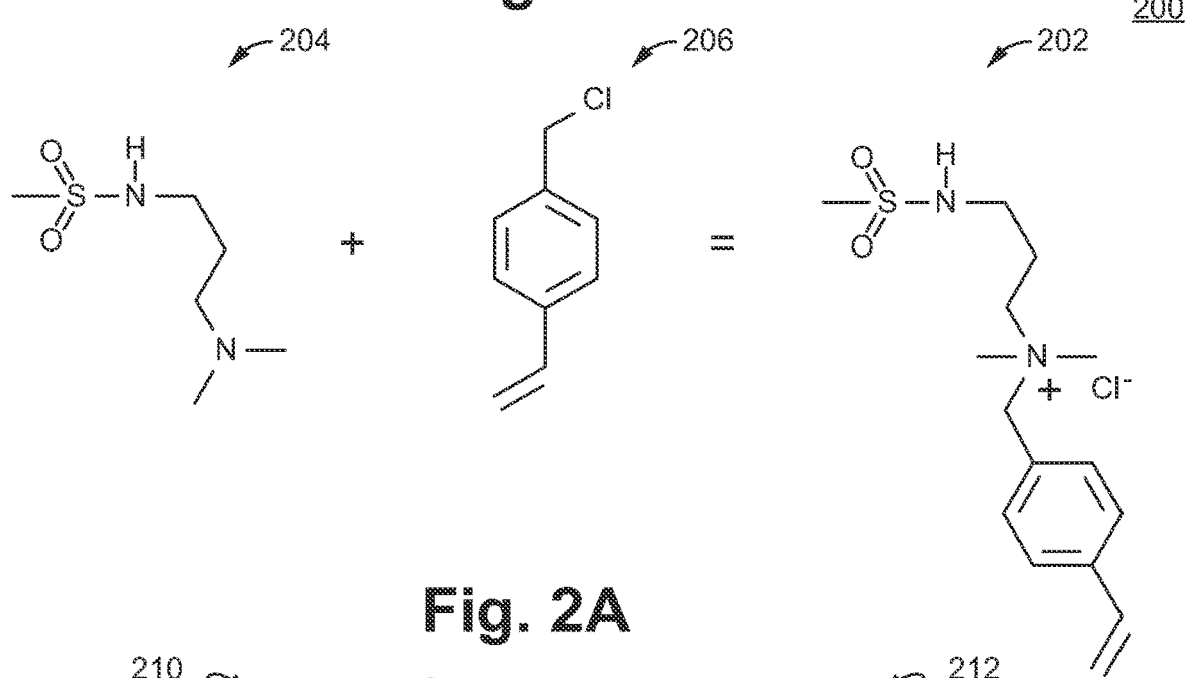
FIG. 2A illustrates a process of making a monomer that is used to be coupled with a positively charged polymer layer in accordance with some embodiments.

FIG. 2A illustrates a process 200 of making a monomer 202 that can be coupled with a positively charged polymer layer in accordance with some embodiments. The monomer 202 is able to be the sulfonamide-quaternary anion exchange monomer, which is able to be formed by reacting a sulfonamide/tertiary amine containing moiety 204 and a linking agent 206. In some embodiments, the sulfonamide/tertiary amine containing moiety 204 can be formed by reacting one amine group of a diamine with sulfonyl chloride.

Figure 2B:
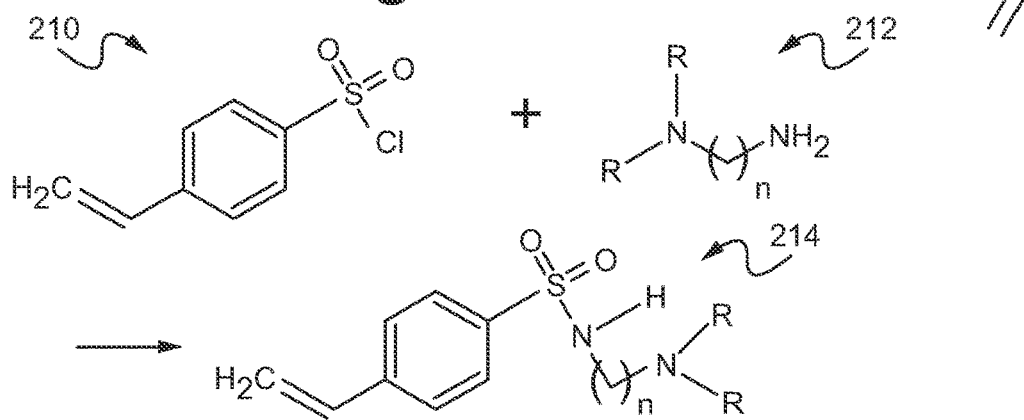
FIG. 2B illustrates a process of making a sulfonamide/tertiary amine containing moiety with linker in accordance with some embodiments.

FIG. 2B illustrates a process of making a sulfonamide/tertiary amine containing moiety with linker in accordance with some embodiments. In some embodiments, the sulfonamide/tertiary amine containing moiety with linker 214 can be formed by reacting one amine group of a diamine 212 with a vinylarylsulfonyl chloride, such as 4-vinylbenzylsulfonyl chloride 210. The "n" number of the diamine 212 can be 1, 2, 3, 4, or 5, which is the length of the carbon chain between the two nitrogens of the diamine 212, and preferably n ranges from 2 to 3. The R of the diamine can be an unsubstituted alkyl or substituted alkyl, and preferably a $C_1$ to $C_3$ unsubstituted alkyl. In some embodiments, one amine of diamine 212 can be quaternized. In some embodiments, the diamine compound is in the form of an asymmetric diamine. In some embodiments, the diamine compound comprises a diamine 302 and 304 of FIG. 3.

In an exemplary embodiment, the sulfonamide containing moiety 204 is N,N-dimethylaminopropyl methylsulfonamide and the linking agent 206 is 4-vinylbenzyl chloride. The reaction of the sulfonamide/tertiary amine containing moiety 204 and the linking agent 206 forms the monomer 202, which is able to be used to be grafted onto a positively charged polymer layer (e.g., the polymer 110 of FIG. 1 or 406 of FIG. 4B), which is able to be used as a resin containing the quaternary ion exchange sites for an ion chromatography column. The vinyl group of monomer 202 can react and bind to the vinyl group of positively charged polymer 406.

Figure 3:
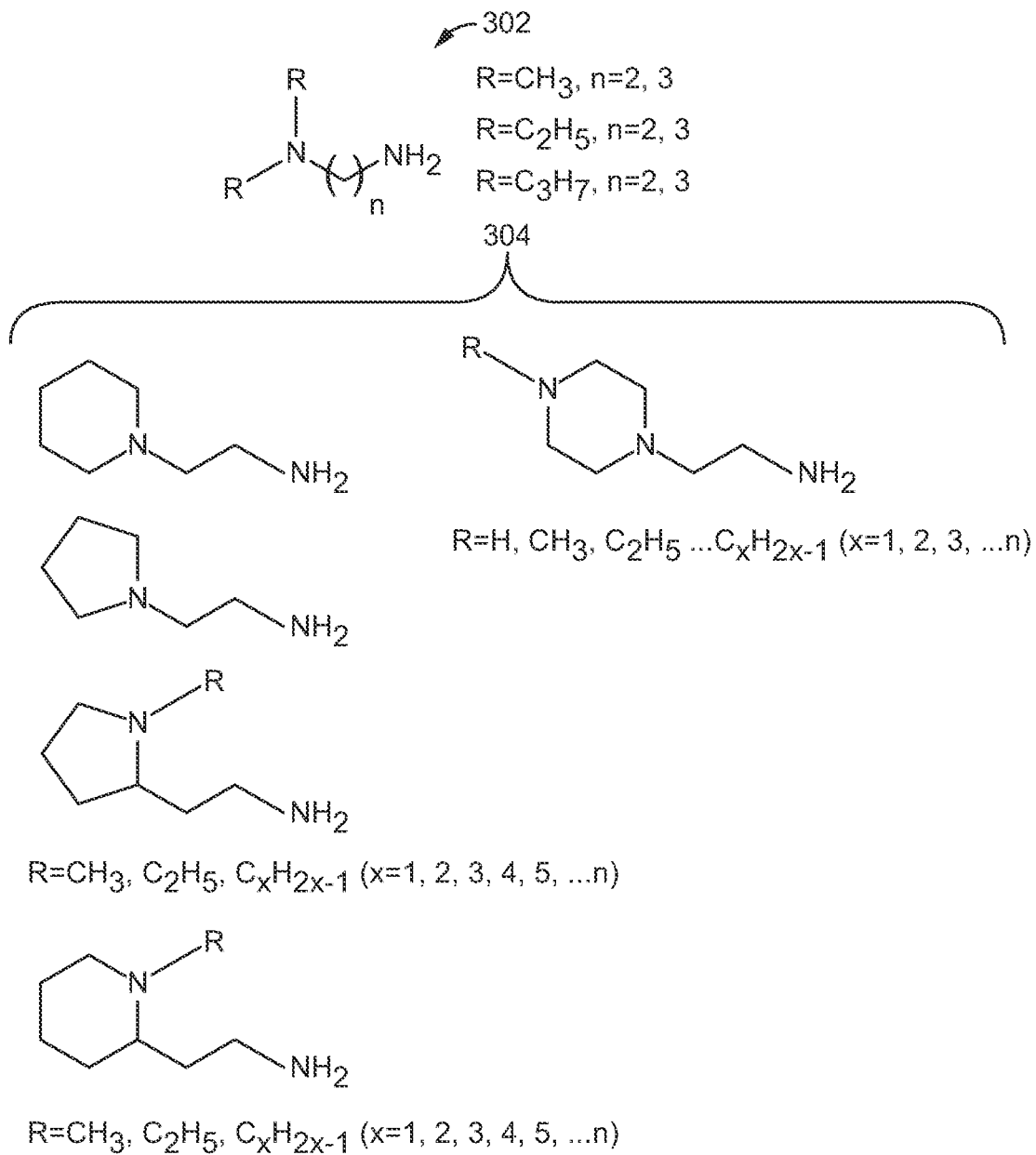
FIG. 3 illustrates diamines that are used as part of the sulfonamide containing moiety in accordance with some embodiments.

FIG. 3 illustrates various diamines 300 that can be used for synthesizing the sulfonamide containing moiety 204 of FIG. 2 in accordance with some embodiments. In some embodiments, the diamines include asymmetric diamines. The asymmetric diamines include trialkyl amines 302. In some embodiments, R of the trialkyl amine includes $CH_3$, $C_2H_5$, $C_3H_7$ and n=2, 3. A person of ordinary skill in the art appreciates that any trialkyl amines are within the scope of the present disclosure. For example, $C_xH_{2x-1}$ (wherein x=1, 2, 3, 4, or 5) and n=1, 2, 3, 4, or 5), wherein n is the length of the carbon chain between the two nitrogens of the diamine 302, are within the scope of the present disclosure.

In some embodiments, the diamines for the sulfonamide containing moiety 204 of FIG. 2 include heterocyclic amines 304, such as five-membered heterocyclic amines (e.g., azolodine), six-membered heterocyclic amines (e.g., piperidine and heterocyclic diamines). A person of ordinary skill in the art would appreciate that any diamines are within the scope of the present disclosure, so long as the diamines are able to react to form a base structure (e.g., containing at least one sulfonamide and at least one amine) of the ion exchange containing moiety 204.

In some embodiments, linking agents for forming linker 206 of FIG. 2 include vinylbenzyl chloride (VBC), vinylbenzyl bromide (VBB), glycidyl methacrylate, aromatic linkers, diglycidyl ethers, vinylbenzyl glycidyl ether, 2-(4-Vinylbenzyloxy)ethyl glycidyl ether, and glycidyloxy ethyl methacrylate. A person of ordinary skill in the art appreciates that any chemical structures that are able to serve as a linker/connector between the sulfonamide containing moiety and the positively charged polymer layer are within the scope of the present disclosure. For example, the linking agent 206 of FIG. 2 is able to contain a vinyl group and a nitrogen reactive group. In some embodiments, the nitrogen reactive group is selected from the group consisting of an epoxide, an alkyl halide, a benzylhalide, and a combination thereof. Specific examples of linking agents include, for example, 2-glycidyloxyethyl methacrylate, 3,4-epoxybutyl methacrylate, 4,5-epoxypent-2-yl methacrylate, 4,5-epoxypentyl methacrylate, and 2-glycidyloxyethyl methacrylate, 4-vinylbenzylsulfonyl chloride, and amido- and keto-derivatives of the above.

In some embodiments, the sulfonamide monomers similar to monomer 202 of FIG. 2A can be prepared by the reaction using predetermined precursor molecules with tertiary amine and include, without being limiting to the present disclosure, quaternary ammonium salts of epoxy- or haloalkyl acrylates or methacrylates where alkyl comprises straight or branched chain alkyl groups with from about 4 to about 13 carbon atoms and optionally containing from 0 to about 3 heteroatoms.

FIG. 4A illustrates a structure 400 of the base polymer layer, which is a precursor to positively charged polymer layer 110 of FIG. 1 in accordance with some embodiments. The structure 400 is one of the exemplary embodiments. In some embodiments, one or more linkers are between the sulfonamide containing moiety and the positively charged polymers. In some embodiments, one or more linkers are between the substrate and the positively charged polymers. In some embodiments, the structure 400 comprises one or more tertiary amines, one or more ether groups, one or more hydroxyl groups, or a combination thereof. As shown in the structure 400, repeating units of the structure range from 5 to about 150.

In some embodiments, the negatively charged substrate particle 112 of FIG. 1 contains one or more super macroporous particles (SMP). Some exemplary processes of preparing the SMP is further illustrated in the Example 1 below in the section of General Synthetic Procedure. In some alternative embodiments, the SMP are obtained from commercial sources, including Agilent PLRP-s1000A and Waters Styragel HR4-HR6. The super macroporous particle can have a diameter of 4-6 μm, a surface area of 20-30 m²/g, pore sizes of 1000 Å-2000 Å, and a crosslinking mole ratio of 55% of the divinylbenzene and a mole ratio of 45% of the ethylvinylbenzene.

Figure 4C:
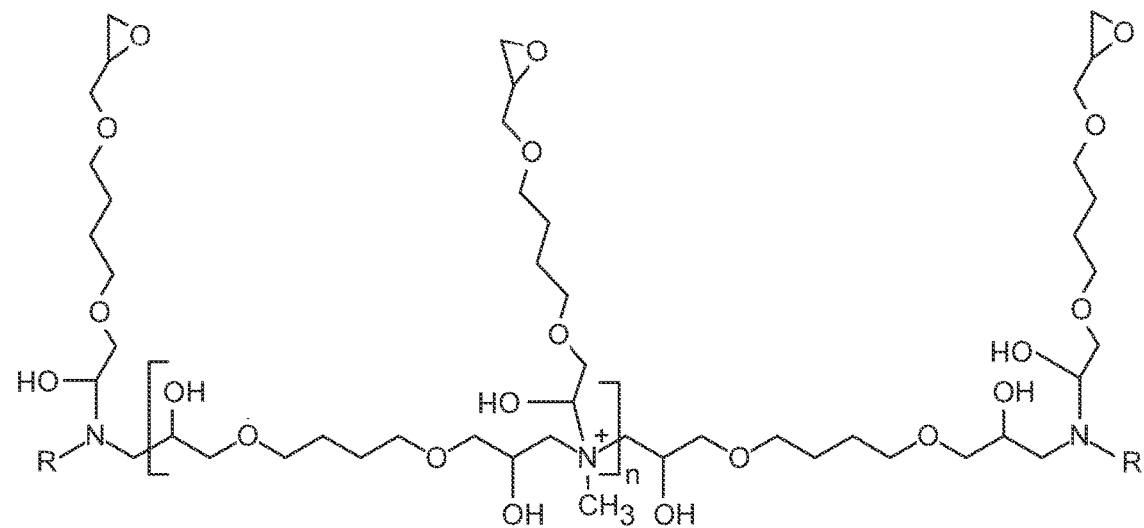
FIG. 4C illustrates a structure of grafted butanediol diglycidyl ether to form pendant epoxide groups on the base polymer in accordance with some embodiments.
Figure 4D:
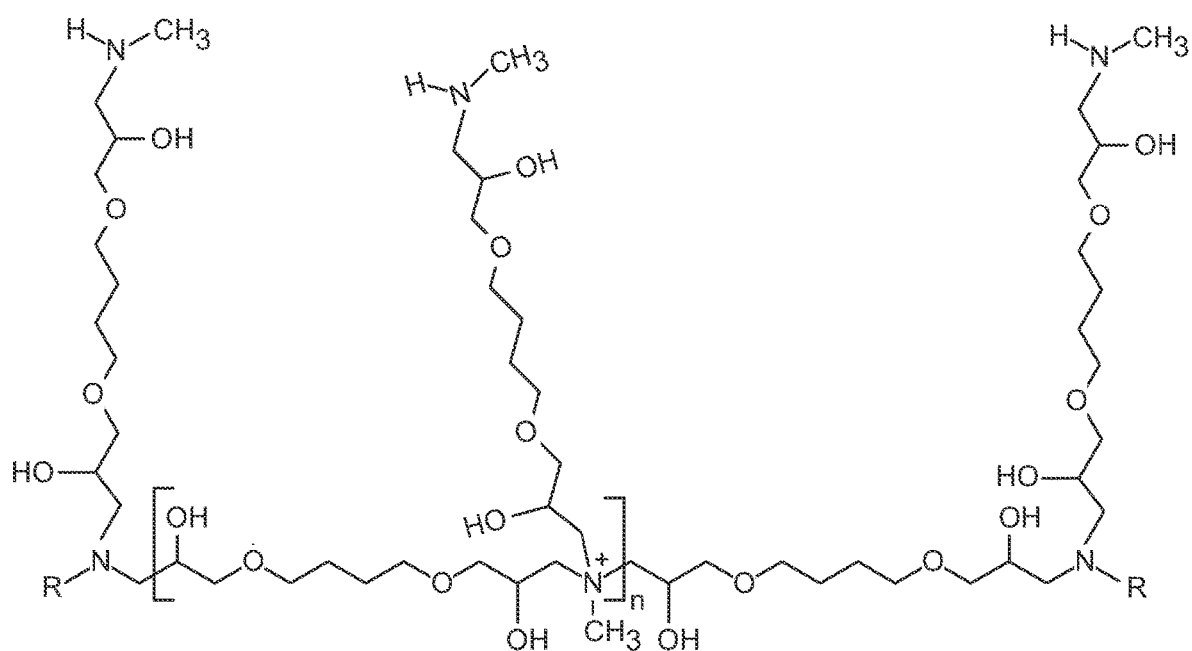
FIG. 4D illustrates a structure of pendant amine groups coupled to the base polymer in accordance with some embodiments.
Figure 4E:
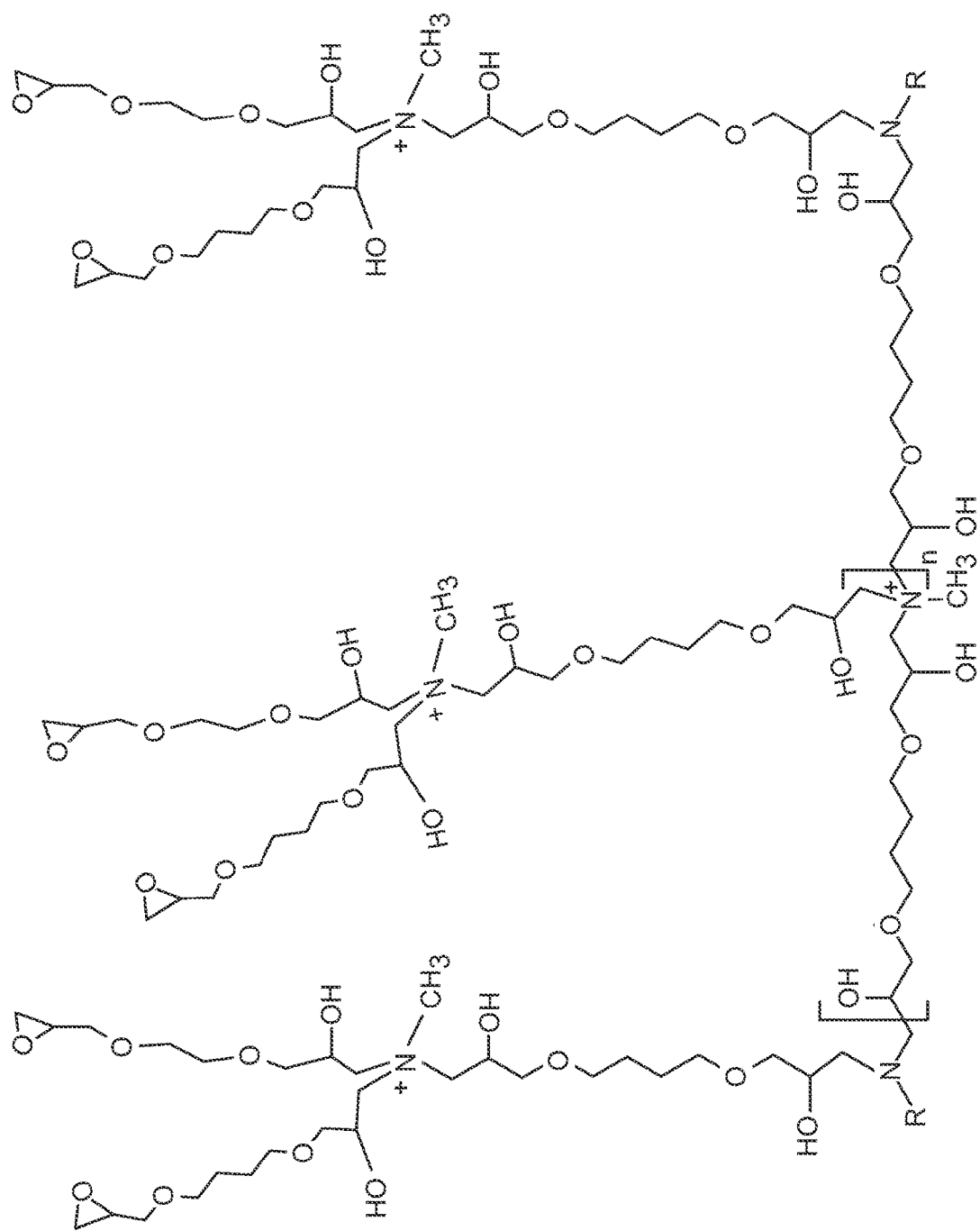
FIG. 4E illustrates a hyperbranched structure of pendant epoxide groups in accordance with some embodiments.

FIG. 4B illustrates a process 400A of grafting a linker vinylbenzyl chloride 402 to a polymer chain 404 in accordance with some embodiments. The linking agent 402 is grafted onto the polymer chain 404 forming the positively charged polymer 406, which is able to be the positively charged polymer layer 110 of FIG. 1. In FIGS. 4A to 4E, R can be an unsubstituted alkyl, substituted alkyl, or H.

In the following, a process of making a resin with an ion exchange group capable of forming a zwitterionic functional groups that is used as a stationary phase of an ion chromatography is provided in accordance with some embodiments.

Figure 5:
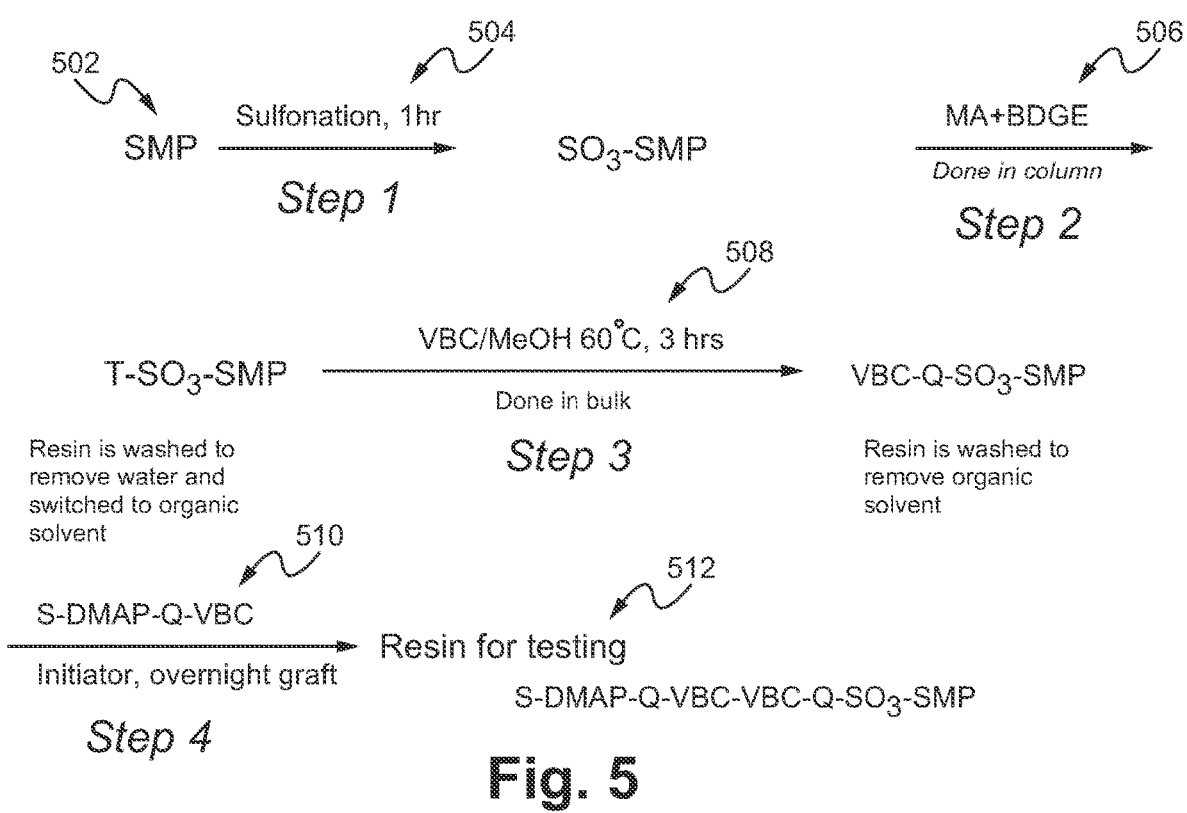
FIG. 5 shows a resin preparation process in accordance with some embodiments.

FIG. 5 shows a resin preparation process 500 in accordance with some embodiments. The resin is used as a stationary phase of an ion chromatography. At a Step 502, a super macroporous particle (SMP) is prepared. At a Step 504, SMP was sulfonated with sulfuric acid. Some exemplary processes of preparing the sulfonated SMP resin are illustrated in the Example 2 below.

In some embodiments, the SMP has a particle size of 4-6 μm, a surface area of 20-30 m²/g, pore size of 1000 Å-2000 Å, and a crosslinking rate of 55%. A person of ordinary skill in the art would appreciate that any other polymer particles are within the scope of the present disclosure, so long as the substances are suitable for serving as the substrate for an ion exchange chromatography. In some embodiments, hyperbranched structures are used as the substrate. Reaction materials, conditions, and procedures for preparing the SMP and hyperbranched structures are further disclosed in the U.S. Pat. No. 7,291,395, titled "Coated ion exchanged substrate and method of forming" and U.S. Pat. No. 9,283,494, titled "Agglomerated ion exchange panicle bed and method," which are incorporated by reference in their entirety for all purposes.

In some embodiments, the sulfonated SMP resin is grafted with a monomer (e.g., the monomer 202 (FIG. 2) having one or more sulfonamide contained moiety) using a free radical grafting. At a Step 506, the sulfonated SMP resin is coated with a positively charged polymer layer (e.g., layer 406 of FIG. 4B). In an embodiment, the SMP resin can be packed into a chromatography column and particular reagents flowed through the column to form the positively charged polymer layer in situ. For example, a reagent solution can include the butanediol diglycidyl ether (BDGE) and methyl amine (MA) to form base layer 400, as illustrated in FIG. 4A. At a Step 508, a linker is attached to the based layer by reacting with vinylbenzyl chloride (VBC) to form the positively charged polymer 406, as illustrated in FIG. 4B. At a Step 510, a free radical grafting process is performed, in which the sulfonated SMP resin is grafted with the sulfonamide/ion exchange group contained moiety. Some exemplary processes of preparing a sulfonated SMP resin complexed to a positively charged polymer grafted with the linker VBC using the free radical approach is illustrated in the Example 4 below.

In some other embodiments, the sulfonated SMP resin complex is grafted with sulfonamide contained moiety using a layer by layer approach, which forms a hyperbranched platform. Some exemplary processes of preparing the sulfonated SMP resin grafted with a chain having sulfonamide and quaternary amine moiety using the layer-by-layer approach is illustrated in the Example 5 below.

Example 1: Sulfonation of SMP Resin 25 g of SMP resin was dispersed in 125 g of glacial acetic acid. 500 g of concentrated sulfuric acid was slowly added to the dispersion. Next, it was thoroughly mixed and sonicated in a water bath at room temperature for 60 minutes. The reaction mixture was poured over ~1000 g of ice. Once the reaction mixture equilibrated to room temperature, the reaction mixture was filtered, and washed with DI water (deionized water) until the washing showed a pH close to neutral. The resin was isolated for further functionalization.

Example 2: Procedure for Making Sulfonated Resin with Positively Charged Polymer that Includes Grafted VBC 20 g of sulfonated SMP resin was packed into a 9×250 mm column. A combination of 72% 1.4 butanediol diglycidyl ether (10 wt % solution in DI water) and 28% methyl amine (4 wt % solution in DI water) was pumped through the column while being maintained at 65° C. at a flow rate of 0.5 mL/min for 60 min. The column was then unpacked and the resin was slurried in 100 mL of DI water with sonication for 30 seconds with a probe sonicator and sieved through a 38 μm sieve and filtered. Next, the resin was then dispersed in 100 mL of methanol and filtered. It was then rinsed with 2 aliquots of 50 mL of methanol. The resin was then stirred gently in 100 mL of a 5% solution of vinylbenzylchloride (VBC) in methanol for 3 to 4 hrs at 60° C. The mixture was filtered and the resin washed with 4 aliquots of 50 mL of MeOH (methanol) and 3 aliquots of 50 mL of DI water. The sulfonated resin with a positively charged polymer that included grafted VBC was then isolated.

Example 3: Procedure for Grafting Sulfonamide/Quaternary Amine/VBC Monomer 1.7 g of N,N Dimethyl-N-vinylbenzyl-aminopropyl methylsulfonamide monomer 202 was dissolved in 10 g of DI water. 5 g of the resin from Example 2 was then dispersed in this solution and 0.2 g of initiator (e.g., 2,2'-Azobis[2-(2-imidazolin-2-yl)propane]dihydrochloride. Wako VA-044) is added and thoroughly mixed. The mixture was then tumbled at 52° C. for 12-16 hrs. The reaction mixture was then diluted to 100 mL with DI water, filtered and washed with 1) DI water, 2) Acetone, 3) DI water, 4) 0.5 M NaOH, 5) DI water and finally 0.5 M $Na_2CO_3$. The resin was then isolated for testing.

Example 4 Procedure for Forming Hyperbranched Resin with Grafted Sulfonamide/Quaternary Amine 20 g of sulfonated SMP resin was packed into a 9×250 mm (diameter×length) column and the following solutions were pumped through the column at 65° C. at a flow rate of 0.5 mL/min (unless stated otherwise). The reaction is performed based on the steps, reaction conditions, and reagents described below.
E1: DI water
E2: 10% 1,4-Butanediol diglycidyl ether
E3: 4% Methyl amine
E4: 5% N,N-Diethylaminoethyl methylsulfonamide

Figure 4F:
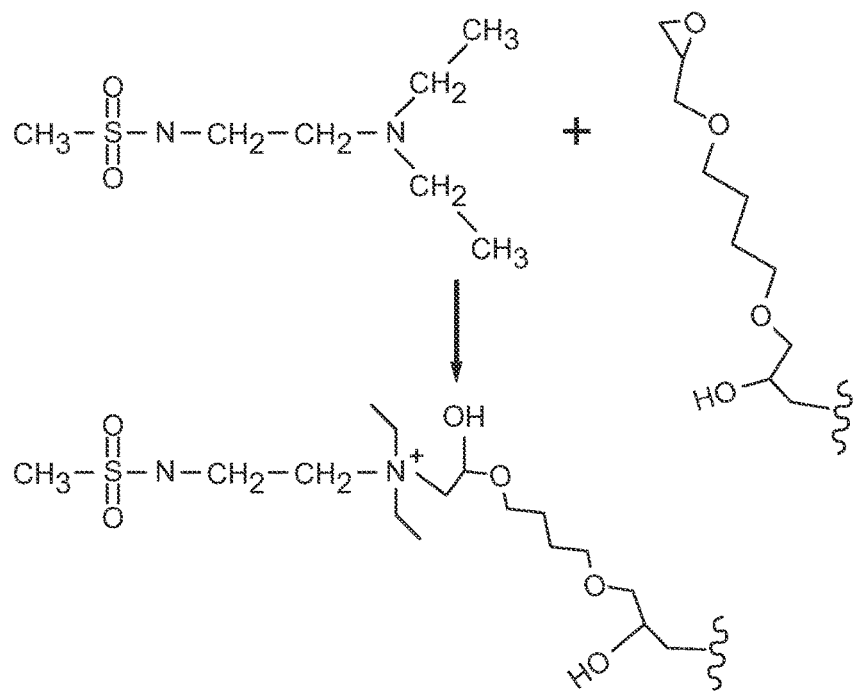
FIG. 4F illustrates a pendant epoxide group of the hyperbranched structure linking with a tertiary amine/sulfonamide moiety to form a quaternary amine. The squiggle is a shorthand representation of a portion of the hyperbranched structure shown in FIG. 4E.

| Steps | E1 | E2 | E3 | E4 | Comments |
|---|---|---|---|---|---|
| 1. | 0 | 72 | 28 | 0 | 60 minute duration-create base layer polymer. See FIG. 4A. |
| 2. | 100 | 0 | 0 | 0 | DI water for 5 minute duration |
| 3. | 0 | 100 | 0 | 0 | 20 minute duration-create pendant epoxide groups. See FIG. 4C. |
| 4. | 100 | 0 | 0 | 0 | DI water for 5 minute duration |
| 5. | 0 | 0 | 100 | 0 | 20 minute duration-methyl amine react with pendant epoxide groups to form secondary amine. See FIG. 4D. |
| 6. | 100 | 0 | 0 | 0 | DI water for 5 minute duration |
| 7. | 0 | 100 | 0 | 0 | 20 minute duration-react up to two epoxide groups with secondary amine to form two branches. See FIG. 4E. |
| 8. | 100 | 0 | 0 | 0 | DI water for 5 minute duration |
| 9. | 0 | 0 | 0 | 100 | N,N-Diethylaminoethyl methylsulfonamide for 30 minute duration at 1.5 mL/min. See FIG. 4F. |
| 10. | 100 | 0 | 0 | 0 | DI water rinse for 30 minute duration at 3 mL/min |
| 11. | 100 | 0 | 0 | 0 | Turn the pump flow to 0 mL/min and take out the column from water bath. Let it sit overnight at RT before resin clean-up. |

The column was then unpacked and the resin was slurried in 100 mL of DI water with sonication for 30 seconds with a probe sonicator and sieved through a 38 µm sieve and filtered. Next, the resin was then isolated for testing.

Example 5

Figure 6:
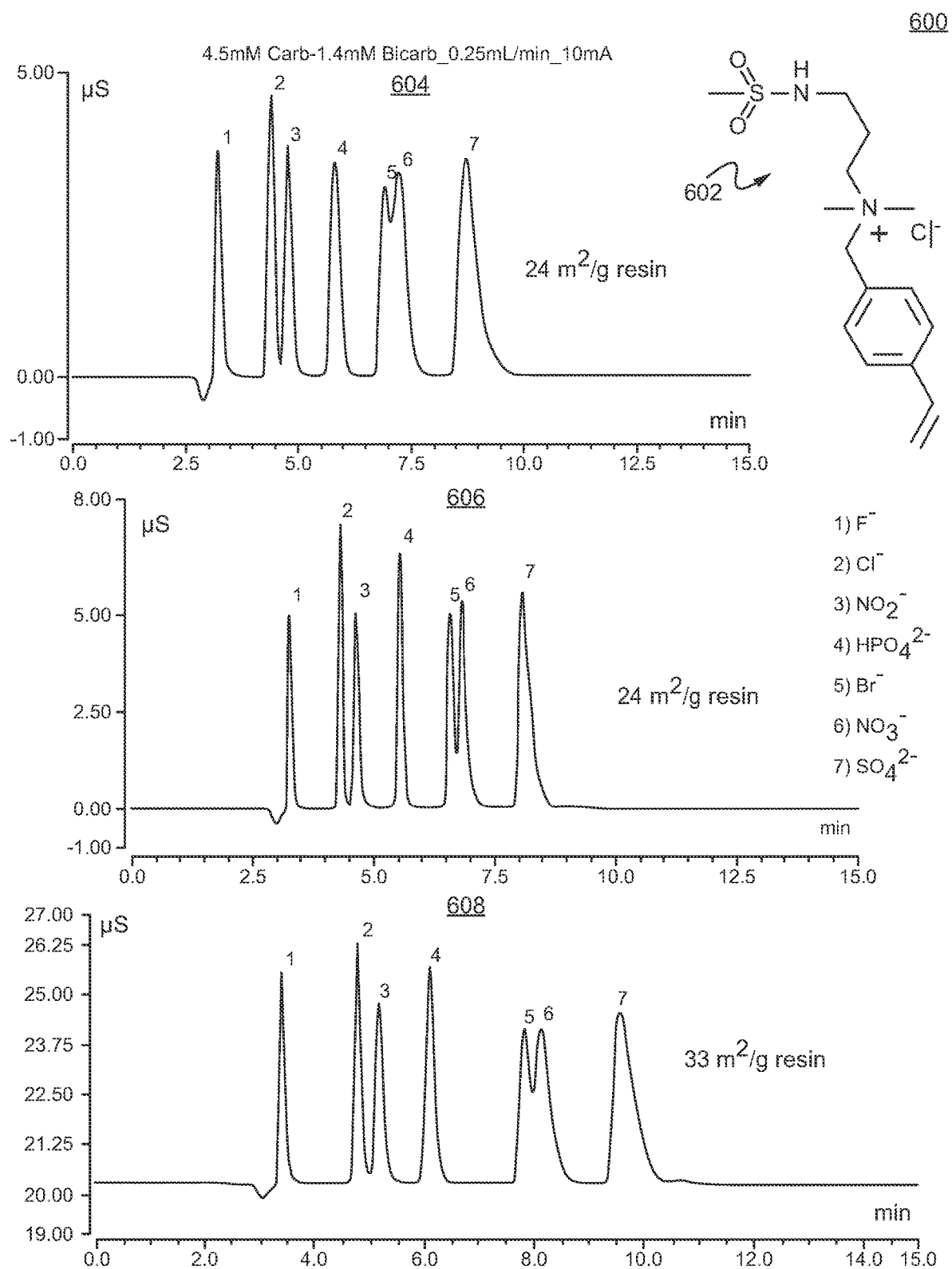
FIG. 6 shows testing results of an ion exchange chromatography containing N,N-dimethylaminopropyl methylsulfonamide moiety in accordance with some embodiments.

FIG. 6 shows three chromatograms (604, 606, and 608) of an ion exchange chromatography column containing N,N-Dimethylaminopropyl methyl sulfonamide moiety 602 in accordance with Examples 1-3. The analysis was carried out on a Thermo Fisher Scientific ICS 5000 system. The analysis conditions are listed below. The carbonate/bicarbonate eluent was manually prepared.
Column Dimensions: 2×250 mm
Eluent: 4.5 mM $Na_2CO_3$/1.4 mM $NaHCO_3$ (unless stated otherwise)
Flow Rate: 0.25 mL/min
Injection Volume: 2.5 µL
Temperature: 30° C.
Detection: Suppressed Conductivity, Dionex AERS 500.4 mm, AutoSuppression, recycle mode
Suppressor Current 10 mA
The elution order and concentration for the 7 anion standard solution are listed below.

| Peaks | Concn (ppm) |
|---|---|
| 1. Fluoride | 5.0 |
| 2. Chloride | 10.0 |

-continued

| Peaks | Concn (ppm) |
|---|---|
| 3. Nitrite | 15.0 |
| 4. Phosphate | 40.0 |
| 5. Bromide | 25.0 |
| 6. Nitrate | 25.0 |
| 7. Sulfate | 30.0 |

The chromatograms 604 and 606 were performed on a resin having a surface area of 24 $m^2/g$. The chromatogram 608 was performed on a resin having a surface area of 33 $m^2/g$.

As shown in the chromatograms 604, 606, and 608, the S-DMAP-Q-VBC-VBC-Q-SO3-SMP (512 of FIG. 5) contained stationary phase column was able to elute phosphate (e.g., peak #4) before Br (e.g., peak #5) and $NO_3$ (e.g., peak #6). The peaks of phosphate in the experiments of 601, 606, and 608 are clearly separated from the peaks of $Br^-$ and $NO_3^-$.

Example 6

Figure 7:
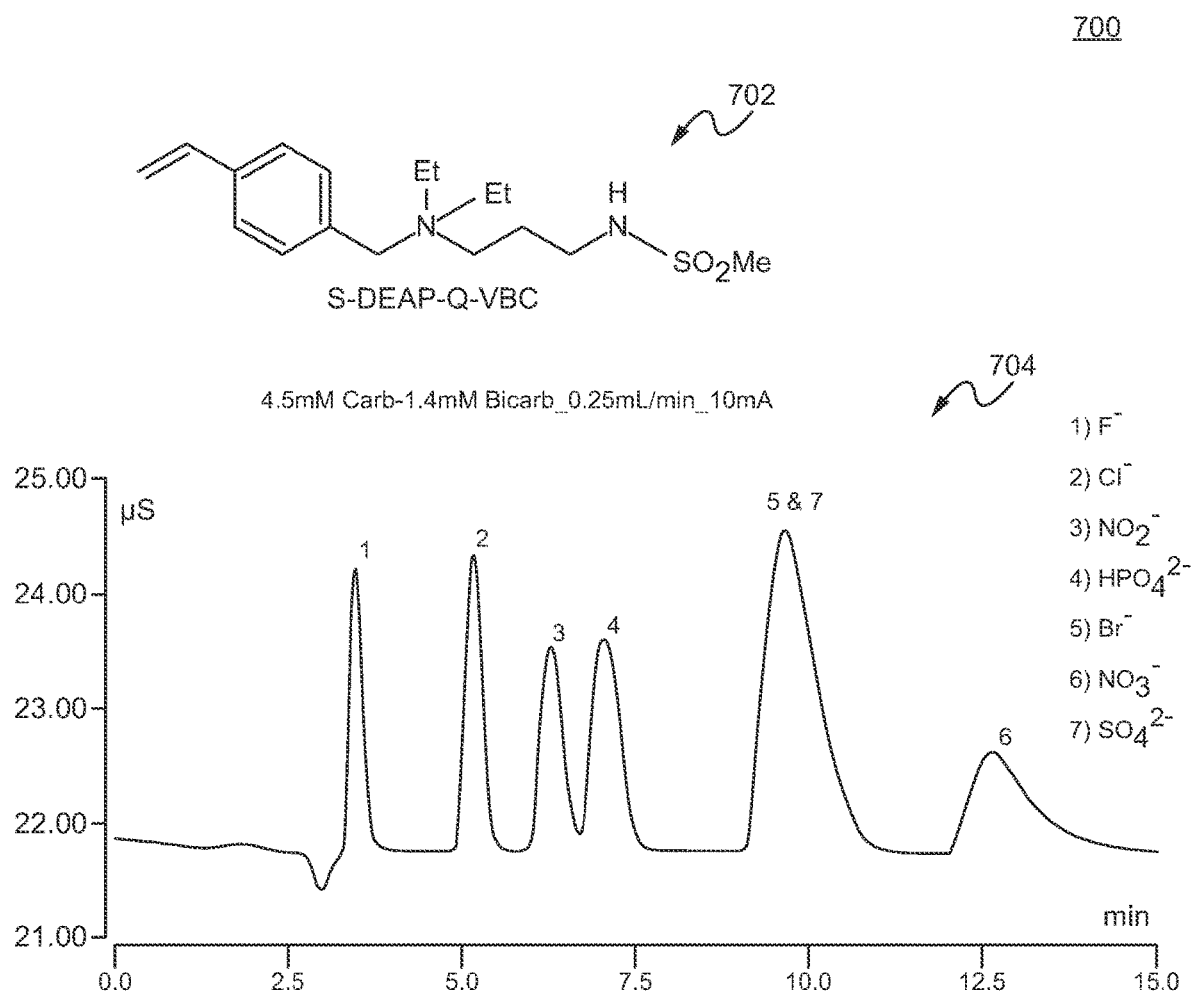
FIG. 7 illustrates a diethyl analog (S-DEAP-Q-VBC) 702 and a chromatogram using a stationary phase incorporating the diethyl analog in accordance with some embodiments.

FIG. 7 illustrates a diethyl analog (S-DEAP-Q-VBC) 702 that replaced the two methyl groups of N,N-Dimethylaminopropyl methylsulfonamide with two ethyl groups in the stationary phase in a manner similar to Examples 1-3. The chromatogram 704 was tested in a manner similar to Example 5 and showed that the peak of Br (peak #5) is separated from the peak of $NO_3$ (peak #6), while the peak of Br overlaps with the peak of $SO_4^{2-}$ (peak #7).

Example 7

Figure 8:
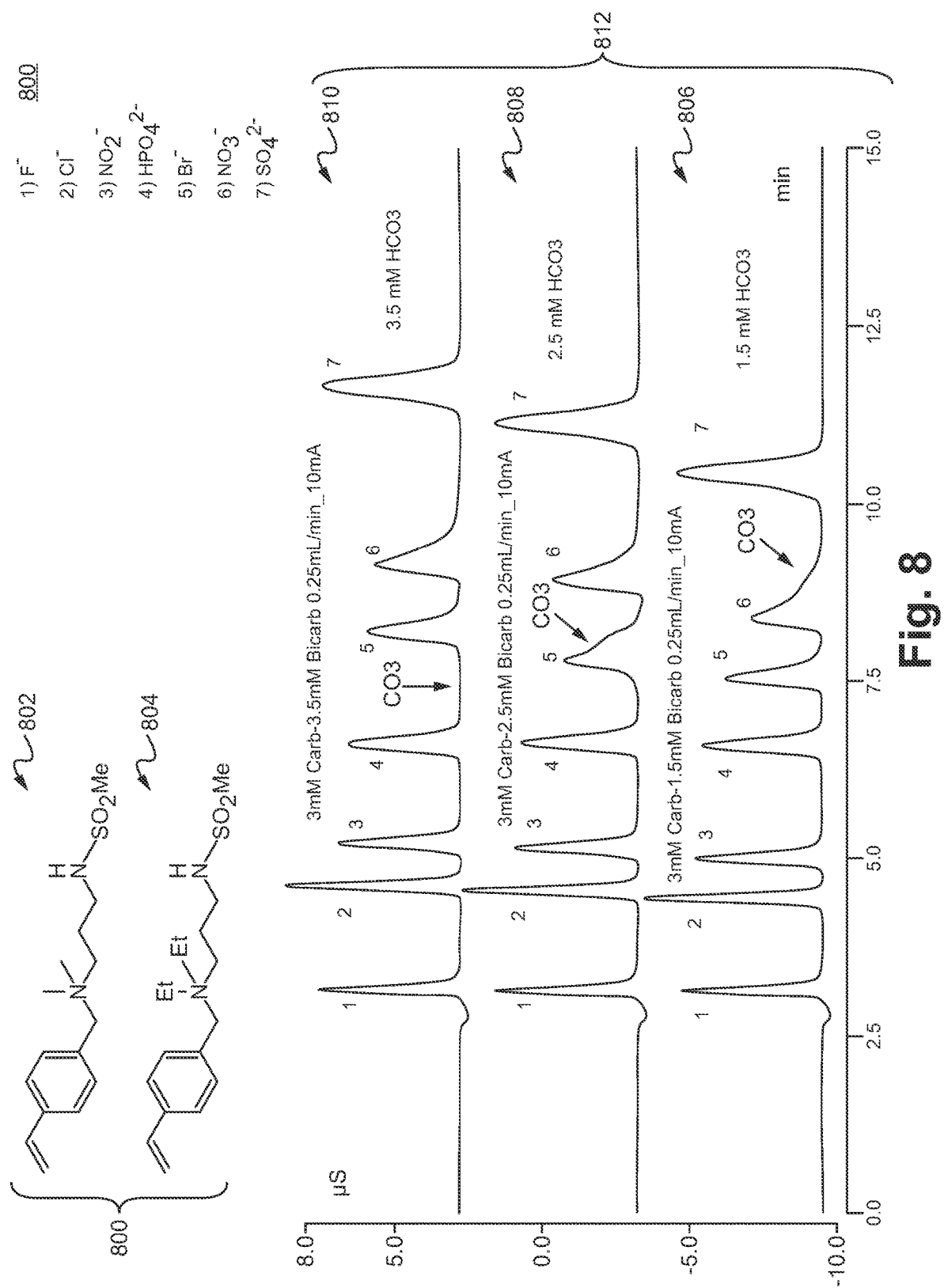
FIG. 8 illustrates a 50%:50% blend 800 of diethyl analog (S-DEAP-Q-VBC) and dimethyl compound (S-DMAP-Q VBC) and chromatograms using a stationary phase incorporating the 50%:50% blend in accordance with some embodiments.

FIG. 8 illustrates a 50%:50% blend 800 of diethyl analog (S-DEAP-Q-VBC) 804 and dimethyl compound (S-DMAP-Q-VBC) 802 was reacted at the same time with the stationary phase in a manner similar to Examples 1-4. A person of ordinary skill in the art would appreciate that any ratio of the blend (such as the blend 800) are within the scope of the present disclosure. The chromatograms 812 show that the peak of $Br^-$ (peak #5), $NO_3^-$ (peak #6), $SO_4^{2-}$ (peak #7) were separated from each other. The chromatograms 812 also show that the concentration of bicarbonate in the eluent affects the peak timing of $CO_3^{2-}$ peak. As shown in the chromatogram 806, the peak of $CO_3^{2-}$ overlaps with peak #6 of $NO_3^-$ when the concentration of bicarbonate is 1.5 mM and the concentration of carbonate is 3 mM. As shown in the chromatogram 808, the peak of $CO_3^{2-}$ overlaps with peak #5 of Br when the concentration of bicarbonate is 2.5 mM and the concentration of carbonate is 3 mM. As shown in the chromatogram 810, the peak of $CO_3^{2-}$ does not overlap with any of the peaks of $NO_3^-$ and Br when the concentration of bicarbonate is 3.5 mM and the concentration of carbonate is 3 mM.

Accordingly in some embodiments, the concentration of the bicarbonate or the molar ratio of carbonate/bicarbonate in the eluent is able to be adjusted to avoid the peak of $CO_3^{2-}$ overlapping with any of the peaks of substances tested here within. In some embodiments, the molar ratio of carbonate/bicarbonate is in a range between 3/2.5 (or 1.2) and 3/3.5 (or 0.875), such as 1.1. 1, 0.9, 0.880. In some embodiments, the molar ratio of carbonate/bicarbonate is in a range between 3/3.5 (or 0.875). A person of ordinary skill in the art would appreciate that any other ratios are within the scope of the present disclosure, so long as the peaks eluted do not overlap with the peak of interest. In some embodiments, the ionic strength of the eluent concentration is adjusted to move the peak of carbonate to not overlap with the peak of nitrate when a testing sample contains a relatively high ionic strength.

The ion exchange chromatography using a stationary phase with the blend of 800 is advanced in that the peak of $CO_3^{2-}$ is able to be moved ahead of the peaks of $Br^-$ and $NO_3^-$. Further, the peak of Br is not overlapping with the peak of $NO_3^-$.

Example 8

FIGS. 9A-9D illustrate the effects of a high level of pre-selected analytes using an ion exchange chromatography column containing anion exchange resin made in accordance with Example 4.

Figure 9A:
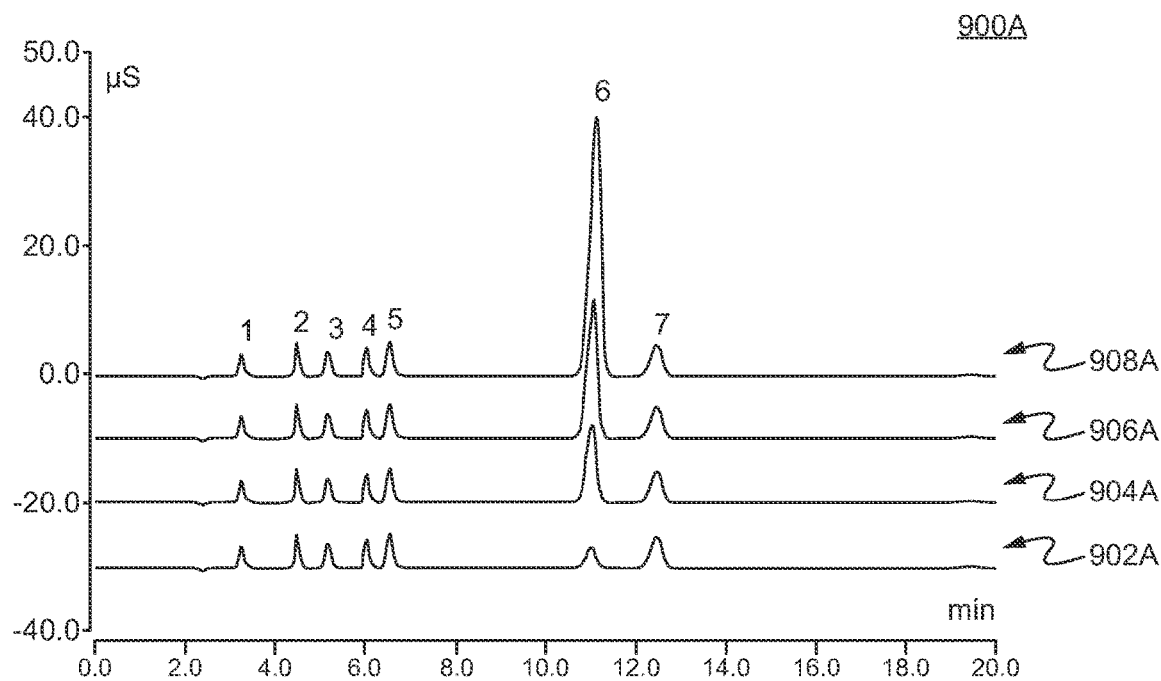
FIGS. 9A-9D illustrate chromatograms testing a possible matrix effect of a relatively high level of a pre-selected analyte on the peak areas of other analyte anions in accordance with some embodiments.

FIG. 9A shows an exemplary result 900A of adding various levels of $PO_4^{3-}$ (peak #6). The chromatograms 902A, 904A, 906A, and 908A were performed using a sample having 40 ppm, 140 ppm, 240 ppm, and 440 ppm of $HPO_4^{2-}/PO_4^{3-}$ respectively. The peaks are denoted as 1) $F^-$ 5 ppm, 2) $Cl^-$ 10 ppm, 3) $NO_2^-$ 15 ppm, 4) Br 25 ppm, 5) $NO_3^-$ 25 ppm, 6) $HPO_4^{2-}/PO_4^{3-}$ 7) and $SO_4^{2-}$ 30 ppm.

The peak areas of $NO_3^-$ (peak #5) are 0.988, 0.948, 0.926, and 0.904 for experiments 1002A, 1004A, 1006A, and 1008A respectively, which show that the area of the $NO_3^-$ peak was relatively unaffected by the amount of $PO_4^{3-}$ (<10% change across the tested range of 40 ppm to 440 ppm phosphate).

Figure 9B:
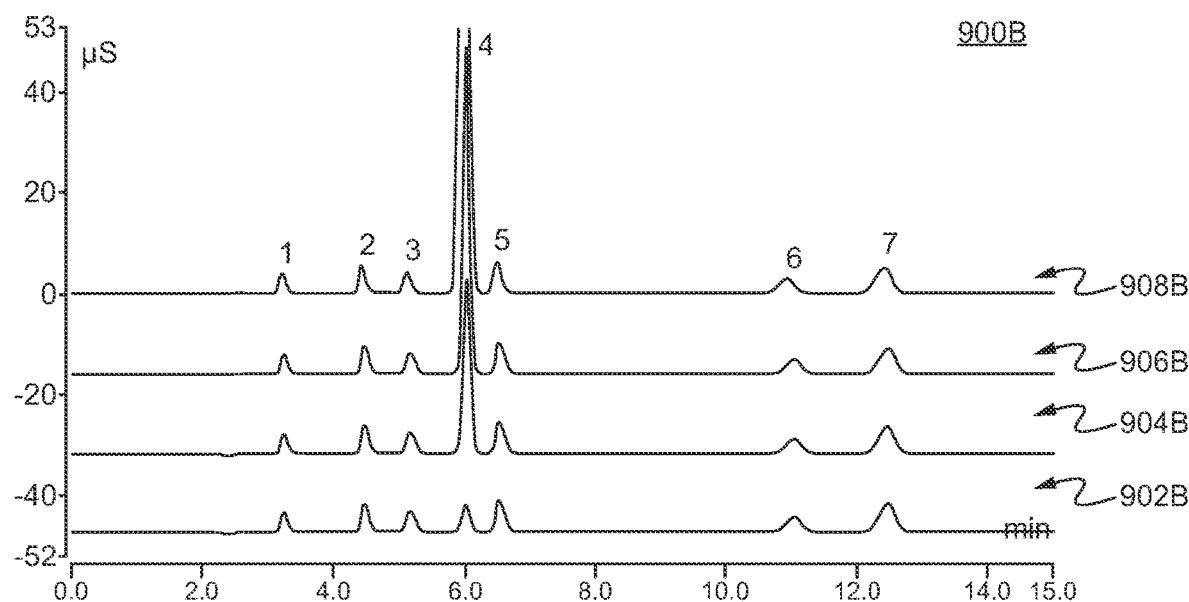

FIG. 9B shows an exemplary result 900B of adding various levels of Br (peak #4). The chromatograms 902B, 904B, 906B, and 908B were performed using a sample having 40 ppm, 140 ppm, 240 ppm, and 440 ppm of Br respectively. The peak areas of $NO_3$ (peak #5) are 0.987, 0.955, 0.927, and 0.970 for experiments 902B, 904B, 906B, and 908B respectively, which show that the area of the $NO_3^-$ peak was relatively unaffected by the amount of Br (<10% change across the tested range of 40 ppm to 440 ppm Br).

Figure 9C:
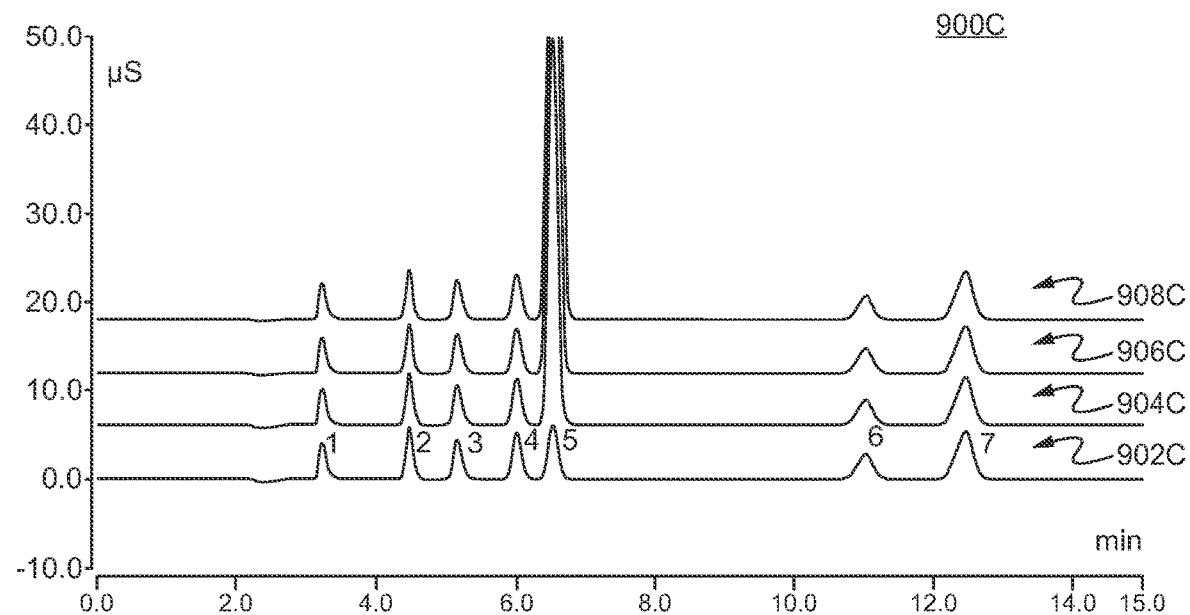

FIG. 9C shows an exemplary result 900C of adding various levels of $NO_3^-$ (peak #5). The chromatograms 902C, 904C, 906C, and 908C were performed using a sample having 40 ppm, 140 ppm, 240 ppm, and 440 ppm of $NO_3^-$, respectively. The peak areas of $Br^-$ (peak #4) are 0.786, 0.773, 0.751, and 0.720 for the experiments 902C, 904C, 906C, and 908C, respectively, which show that the $Br^-$ peak was relatively unaffected by the amount of $NO_3^-$ (<10% change across the tested range of 40 ppm to 440 ppm $NO_3^-$).

Figure 9D:
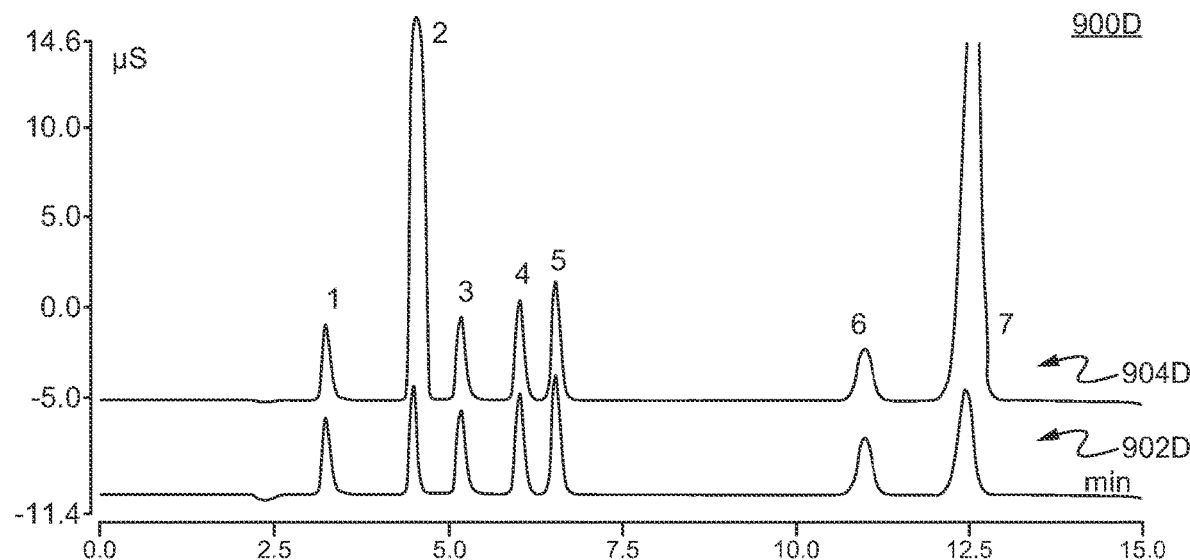

FIG. 9D shows an exemplary result 900D of adding two different combinations of $Cl^-$ (peak #3) and $SO_4^{2-}$ (peak #8). The chromatogram 902D has 110 ppm of $Cl^-$ and 130 ppm of $SO_4^{2-}$ added to a sample containing six other types of anions. The chromatogram 904D has 210 ppm of $Cl^-$ and 230 ppm of $SO_4^{2-}$ added to a sample containing six other types of anions. The peak areas of $NO_3^-$ (peak #5) are 1.000 and 0.974 for the experiments of 902D and 904D, respectively, which show that the $NO_3$ peak was relatively unaffected (<10% change in peak area) by the combination of $Cl^-$ and $SO_4^{2-}$ added up to 210 ppm and 230 ppm, respectively.

TABLE 1A

Peak Area Data of FIG. 9A

| | $PO_4$ concentration (ppm) | | | | |
|---|---|---|---|---|---|
| | 40 | 140 | 240 | 440 | Largest % Change |
| F (5 ppm) | 0.501 | 0.490 | 0.474 | 0.471 | 6% |
| Cl (10 ppm) | 0.699 | 0.674 | 0.659 | 0.645 | 8% |
| $NO_2$ (15 ppm) | 0.672 | 0.655 | 0.639 | 0.626 | 7% |
| Br (25 ppm) | 0.773 | 0.744 | 0.730 | 0.705 | 9% |
| $NO_3$ (25 ppm) | 0.988 | 0.948 | 0.926 | 0.904 | 9% |
| $PO_4$ | 0.790 | 3.288 | 5.963 | 11.851 | n/a |
| $SO_4$ (30 ppm) | 1.568 | 1.483 | 1.464 | 1.423 | 9% |

TABLE 1B

Peak Area Data of FIG. 9B

| | Br concentration (ppm) | | | | |
|---|---|---|---|---|---|
| | 25 | 125 | 225 | 425 | Largest % Change |
| F (5 ppm) | 0.506 | 0.500 | 0.481 | 0.461 | 9% |
| Cl (10 ppm) | 0.702 | 0.690 | 0.656 | 0.680 | 7% |
| $NO_2$ (15 ppm) | 0.691 | 0.662 | 0.635 | 0.656 | 8% |
| Br | 0.770 | 4.842 | 8.939 | 19.263 | n/a |
| $NO_3$ (25 ppm) | 0.987 | 0.955 | 0.927 | 0.970 | 6% |
| $PO_4$ (40 ppm) | 0.795 | 0.778 | 0.757 | 0.774 | 5% |
| $SO_4$ (30 ppm) | 1.542 | 1.508 | 1.443 | 1.488 | 6% |

TABLE 1C

Peak Area Data of FIG. 9C

| | $NO_3$ concentration (ppm) | | | | |
|---|---|---|---|---|---|
| | 25 | 125 | 225 | 425 | Largest % Change |
| F (5 ppm) | 0.512 | 0.524 | 0.502 | 0.478 | 9% |
| Cl (10 ppm) | 0.711 | 0.703 | 0.679 | 0.649 | 9% |
| $NO_2$ (15 ppm) | 0.683 | 0.681 | 0.663 | 0.635 | 7% |
| Br (25 ppm) | 0.786 | 0.773 | 0.751 | 0.720 | 8% |
| $NO_3$ | 1.005 | 6.515 | 12.788 | 25.189 | n/a |
| $PO_4$ (40 ppm) | 0.807 | 0.806 | 0.769 | 0.740 | 8% |
| $SO_4$ (30 ppm) | 1.579 | 1.559 | 1.490 | 1.441 | 9% |

TABLE 1D

Peak Area Data of FIG. 9D

| | Cl & SO4 concentration (ppm) | | | |
| --- | --- | --- | --- | --- |
| | 10, 30 | 110, 130 | 220, 230 | Largest % Change |
| F (5 ppm) | 0.518 | 0.498 | 0.502 | 3% |
| Cl | 0.716 | 11.201 | 24.382 | n/a |
| NO2 (15 ppm) | 0.699 | 0.648 | 0.67 | 7% |
| Br (25 ppm) | 0.795 | 0.758 | 0.757 | 5% |
| NO3 (25 ppm) | 1.008 | 0.974 | 0.974 | 3% |
| PO4 (40 ppm) | 0.845 | 0.765 | 0.761 | 10% |
| SO4 | 1.589 | 7.876 | 14.768 | n/a |

Figure 10:
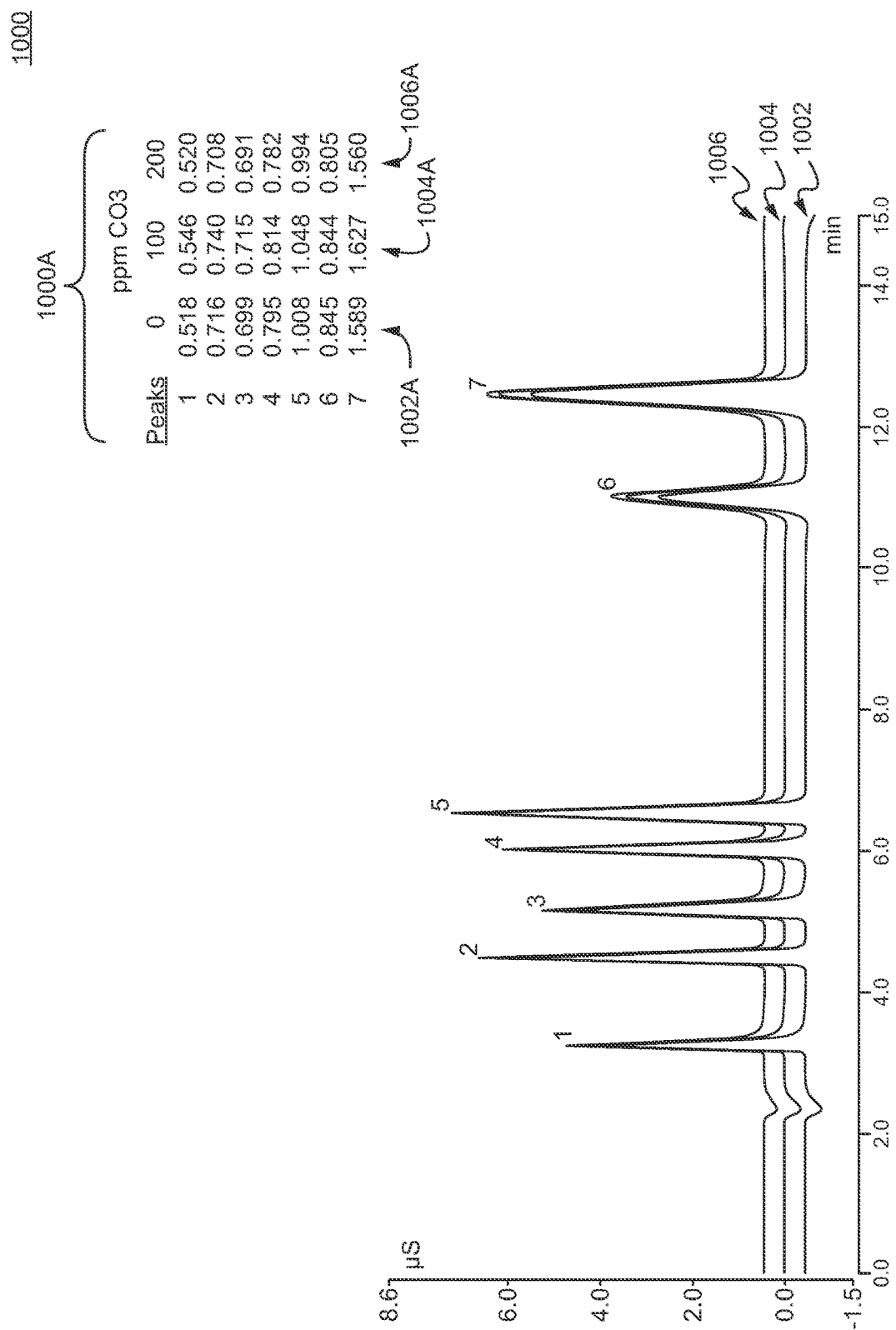
FIG. 10 illustrate chromatograms testing the possible effect of adding $CO_3^{2-}$ to the peak areas of pre-selected analytes in accordance with some embodiments.

FIG. 10 illustrates the effects 1000 of added $CO_3^{2-}$ concentration to a sample containing 7 anions at predetermined concentrations using an ion exchange chromatography column containing anion exchange resin made in accordance with Examples 4. The peaks of chromatograms 1002, 1004, and 1006 are denoted as: 1) $F^-$ 5 ppm, 2) $Cl^-$ 10 ppm, 3) $NO_2^-$ 15 ppm, 4) Br 25 ppm, 5) $NO_3^-$ 25 ppm, 6) $HFO_4^{2-}/PO_4^{3-}$ 7) and $SO_4^{2-}$ 30 ppm. Different levels of $CO_3^{2-}$ were added to the injected sample of chromatogram 1002 ($CO_3^{2-}$: 0 μm), chromatogram 1004 ($CO_3^{2-}$: 100 μm), and chromatogram 1006 ($CO_3^{2-}$: 200 μm), respectively.

As shown in the Table 1000 Å, the peak areas of all the peaks (#1-#7) showed less than a 10% area changes across the range of tested carbonate levels, which show that the stationary phase prepared herein can accurately measure anions and be robust to a wide range of matrix ions that may be present.

The resin prepared herein is able to be utilized in preparing a stationary phase of an ion chromatography, which has a controllable retention time of trivalent analytes and ions that are partially trivalent.

In operation, ion exchange resin capable of forming a zwitterionic state is prepared. The resin is used to prepare a column for ion chromatography. Analytes that are passing through the stationary phase are eluted at different times, due to the different affinity of the analytes and the stationary phase. In some embodiments, the pH is adjusted to control the elution time.

The present invention has been described in terms of specific embodiments incorporating details to facilitate the understanding of principles of construction and operation of the Invention. Such reference herein to specific embodiments and details thereof is not intended to limit the scope of the invention. It is readily apparent to one skilled in the art that other various modifications can be made in the embodiment chosen for illustration without departing from the spirit and scope of the invention. Features in various examples or embodiments are applicable throughout the specification.

What is claimed is:

1. An ion exchange resin comprising:

a negatively charged substrate particle;

a positively charged polymer layer bound to the negatively charged substrate particle, in which the positively charged polymer layer includes a linker; and an ion exchange group including a sulfonamide group and an amine, in which the ion exchange group is coupled to the positively charged polymer layer via the linker;

wherein the positively charged polymer layer comprises:

(a) a structure according to Formula (I):

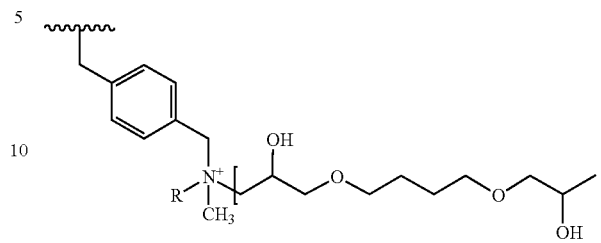

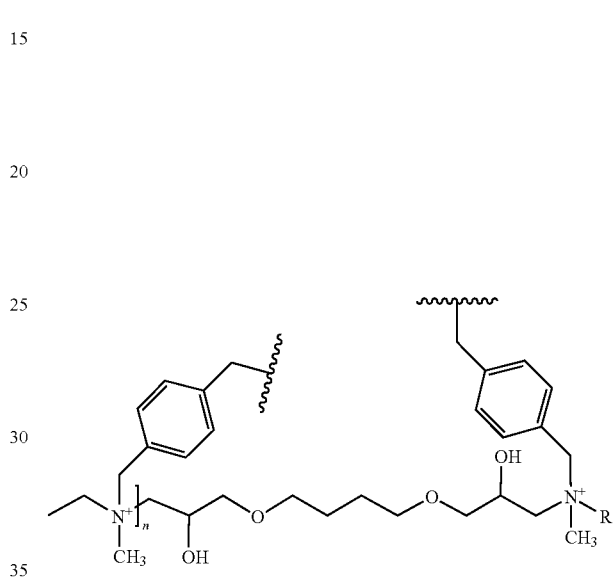

where n ranges from about 5 to about 150, and R is an alkyl group; or (b) a structure according to Formula (III):

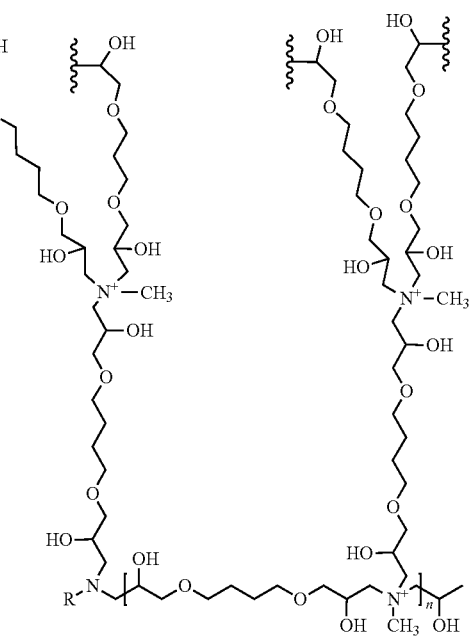

-continued

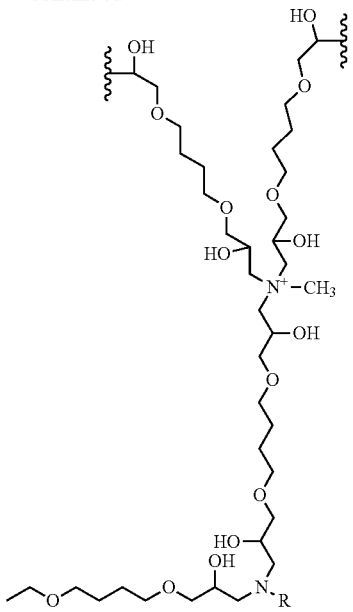

where n ranges from about 5 to about 150, and R is an alkyl group.

2. The ion exchange resin of claim 1, in which the amine of the ion exchange group is selected from a group consisting of a secondary amine, a tertiary amine, a quaternary ammonium, and a combination thereof.

3. The ion exchange resin of claim 1, in which the ion exchange group includes a quaternary ammonium and the ion exchange group is configured to be zwitterionic when the sulfonamide group is in a deprotonated state.

4. The ion exchange resin of claim 1, in which the negatively charged substrate particle is a polymeric particle and the ion exchange resin is configured to retain the ion exchange group when subjected to eluent having a pH ranging from 0 to 14.

5. The ion exchange resin of claim 1, in which the negatively charged substrate particle comprises a sulfonated copolymer of an ethylvinylbenzene and a divinylbenzene.

6. The ion exchange resin of claim 5, in which the negatively charged substrate particle comprises a super macroporous particle.

7. The ion exchange resin of claim 1, in which the positively charged polymer layer further comprises ether groups and hydroxyl groups.

8. The ion exchange resin of claim 1, in which the linker includes an aromatic ring.

9. The ion exchange resin of claim 1 wherein the ion exchange group is a first ion exchange group, the sulfonamide group is a first sulfonamide group, and the amine is a first quaternary ammonium group, wherein the ion exchange resin further comprises
a second ion exchange group including a second sulfonamide group and a second quaternary ammonium group, in which the second ion exchange group is coupled to the positively charged polymer layer via the linker, in which the first quaternary ammonium group is different than the second quaternary ammonium group.

10. The ion exchange resin of claim 9, wherein the first ion exchange group comprises N,N-dimethylaminopropyl methylsulfonamide and the second ion exchange group comprises N,N-diethylaminoethyl methylsulfonamide in a ratio of the first ion exchange group to the second ion exchange group of 1:1.

11. A method of using the ion exchange resin of claim 1 packed in a chromatography column, the method comprising:
flowing an eluent through the chromatography column, in which the eluent comprises carbonate and bicarbonate, and
separating a sample that includes a trivalent species.

12. The method of claim 11 further comprising:
(a) adjusting a ratio of a carbonate concentration and a bicarbonate concentration so that a carbonate peak does not overlap with an analyte peak; and/or
(b) adjusting a pH value of the eluent so that a first analyte peak does not overlap with second analyte peak.

* * * * *